US006962746B2

(12) United States Patent
Taniguchi et al.

(10) Patent No.: US 6,962,746 B2
(45) Date of Patent: Nov. 8, 2005

(54) CONDUCTIVE MEMBER, AND PROCESS CARTRIDGE AND ELECTROPHOTOGRAPHIC APPARATUS WHICH MAKE USE OF THE SAME

(75) Inventors: Tomohito Taniguchi, Shizuoka (JP); Hiroshi Inoue, Kanagawa (JP); Hiroyuki Osada, Kanagawa (JP); Seiji Tsuru, Shizuoka (JP); Hisao Kato, Kanagawa (JP); Noriaki Kuroda, Shizuoka (JP); Atsushi Ikeda, Ibaraki (JP); Toshihiro Otaka, Ibaraki (JP); Shinji Doi, Kanagawa (JP)

(73) Assignees: Canon Kasei Kabushiki Kaisha, Ibaraki-ken (JP); Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 10/410,299

(22) Filed: Apr. 10, 2003

(65) Prior Publication Data

US 2003/0219589 A1 Nov. 27, 2003

(30) Foreign Application Priority Data

Apr. 19, 2002 (JP) ....................................... 2002/117323

(51) Int. Cl.$^7$ ........................... B32B 5/16; G03G 15/00; G03G 15/02

(52) U.S. Cl. ....................... 428/323; 399/159; 399/168; 399/176

(58) Field of Search ................................ 428/412, 413, 428/414, 419, 423.1, 473.5, 474.4, 500, 323–325, 327, 332; 399/159, 168, 176

(56) References Cited

U.S. PATENT DOCUMENTS

| | | | | |
|---|---|---|---|---|
| 5,038,174 | A | 8/1991 | Kato et al. | 355/215 |
| 6,337,962 | B1 | 1/2002 | Inoue et al. | 399/111 |
| 6,340,515 | B1 | 1/2002 | Sasagawa et al. | 428/192 |
| 6,376,594 | B1 | 4/2002 | Sasagawa et al. | 524/495 |
| 6,400,919 | B1 | 6/2002 | Inoue et al. | 399/176 |
| 6,558,781 | B1 | 5/2003 | Fuei et al. | 428/212 |

FOREIGN PATENT DOCUMENTS

| | | |
|---|---|---|
| JP | 2000-39755 | 8/2000 |
| JP | 2001-209235 | 3/2001 |

*Primary Examiner*—Sheeba Ahmed
(74) *Attorney, Agent, or Firm*—Fitzpatrick, Cella, Harper & Scinto

(57) ABSTRACT

In a conductive member having a support and provided thereon at least one cover layer, the cover layer has a surface layer, and the surface layer contains fine particles. In the surface layer, fine particles present at the surface-layer lower part corresponding to a range within 30% of the total layer thickness from the lowermost plane have an average particle diameter which is larger than the average particle diameter of fine particles present at the surface-layer upper part corresponding to a range within 30% of the total layer thickness from the uppermost plane. A process cartridge and an electrophotographic apparatus have such a conductive member.

17 Claims, 8 Drawing Sheets

CONDUCTIVE MEMBER, AND PROCESS CARTRIDGE AND ELECTROPHOTOGRAPHIC APPARATUS WHICH MAKE USE OF THE SAME

BACKGROUND OF THE INVENTION

1. Field of the Invention

This invention relates to a conductive member having at least one cover layer on a support, and a process cartridge and an electrophotographic apparatus which have a charging means having the conductive member as a charging member.

2. Related Background Art

In image-forming apparatus employing an electrophotographic system, i.e., an electrophotographic apparatus, conductive members are used as members such as charging members, developing members, transfer members and so forth. The conductive members used for such purposes are disposed in contact with, or in proximity to, an electrophotographic photosensitive member, and a direct-current voltage on which an alternating-current voltage has been superimposed is applied or only a direct-current voltage is applied to the conductive member when used.

Where the direct-current voltage on which an alternating-current voltage has been superimposed is employed as the applied voltage, a high-voltage alternating-current power source is required. This brings about an increase in the cost of the electrophotographic apparatus. Also, a large quantity of alternating currents are used, and hence the durability of the conductive members and the electrophotographic photosensitive members may decrease. Accordingly, taking account of the cost reduction and high durability of electrophotographic photosensitive members, it is preferable for the applied voltage to be only the direct-current voltage.

Meanwhile, the shape of the conductive members disposed in contact with, or in proximity to, an electrophotographic photosensitive member may include the shape of a roller, the shape of a blade, the shape of a brush, the shape of a belt, the shape of a film, the shape of a sheet and the shape of a chip. Those having the shape of a roller (that is, e.g., charging rollers, developing rollers and transfer rollers) are in wide use.

In recent years, as computers and their peripheral equipment have become popular and have been made to have high performance, electrophotographic apparatus used as output apparatus of these devices are also required to be made to have a higher function. For example, there is a trend toward color-image formation and an increase in graphic-image formation. In such a case, it is required to achieve much higher image quality and it becomes important for images to be faithfully reproduced. As one of means for dealing with these, there is a trend toward making the resolution higher. That is, original images need to be minutely recognized and reproduced, where technical development from 600 dpi toward 1,200 dpi or more is an example thereof.

Where conventional conductive members are used in such electrophotographic apparatus required to achieve much higher image quality (higher resolution), it has come about that white or black fine lines or dots appear under specific conditions or depending on the combination of conditions, such as the voltage to be applied, the environment in which images are reproduced, the patterns to be reproduced and the electrophotographic apparatus used, or that density unevenness occurs because of adhesion of foreign matter to the surfaces of conductive members or partial non-uniform adhesion of foreign matter.

In addition, with a general increase in images reproduced, it has become required for the electrophotographic apparatus to be made more highly durable than ever. In this case, the above density unevenness due to adhesion of foreign matter or partial non-uniform adhesion of foreign matter must be kept from occurring to a certain extent or less over a long period of time as a matter of course, and the conductive members themselves are also required to have high durability. At the same time, it is important to prevent the conductive members from having any negative influence on electrophotographic photosensitive members.

To solve these problems, studies have been conducted on how to prevent or lessen the adhesion or non-uniform adhesion of foreign matter, as exemplified by techniques of controlling the surface shape, the coefficient of friction or surface wettability of conductive members, and the conductive members so made up that fine particles have been made to adhere to their surfaces in advance. Such studies have achieved a certain effect.

Japanese Patent Applications Laid-open No. 2000-39755 and No. 2001-209235 also disclose a conductive member having a single-layer (a layer of a high polymer with conductive fine particles dispersed therein) structure and in which the conductive fine particles have a lower distribution density at the contact part (the surface) and in the vicinity thereof, brought into contact with a contact object member, than at other parts thereof to control the electrical resistance of the conductive member and at the same time to prevent the surface of the electrophotographic photosensitive member from being scratched by any conductive fine particles which may otherwise come off as a result of wear, or prevent the surface layer from peeling. According to this conductive member, the effect of preventing current leakage can also be obtained, and hence, suggests that the surface of this conductive member have a high electrical resistance.

At present, electrophotographic apparatus are required to be adaptable to various kinds of media (recording media) as added value, presupposing that the apparatus are made to have high-quality and high-durability. Such adaptation to media is meant to afford good image quality on various kinds of transfer materials.

At present, in offices as a matter of course and also in private use, there are increasing occasions to output data from computers in color images or graphic images. For example, in offices, a trend toward full-color printing from conventional black-and-white or monochromatic printing is rapidly being put forward. In particular, in making presentations, full-color images are preferable in view of their visual qualities and also in view of the impression the images make. In this case, images are often formed on transmitting PET films (OHT: overhead projection transparent film) as transfer materials.

Image data input devices are also rapidly evolving. For example, there are increasing occasions to i) photograph electronic pictures with digital cameras and input them into computers to perform image processing or editing as the occasion requires, to output the data by means of printers, or ii) copy photographs directly by means of copying machines. In the case when photographic image data are outputted, specialities (speciality paper) (e.g., surface-treated paper and high-gloss paper) are often used as transfer materials. The OHTs and specialities are thicker than plain paper and also differ in materials from plain paper in some cases. In order to form good images on such transfer materials, the process speed is in some cases made lower than that in using plain paper, to adapt reproduction to this material.

In private use also, for example, not only are the specialities used in some cases, but also thick and small-size sheets, such as postcards, are frequently used.

Thus, in order to perform an adaptation to such media (transfer materials) which are different with respect to materials, thickness and size, it is preferable that one electrophotographic apparatus can output image data at a plurality of different process speeds so that proper speeds can be set correspondingly thereto. For example, it is the case that the apparatus is so constructed that a plurality of different process speeds, such as regular speed and ½ speed, ⅓ speed and ¼ speed of the regular speed can be set, where, e.g., the apparatus is used at 94 mm/s (regular speed) in the case of plain paper and at 31 mm/s (⅓ speed) in the case of OHTs.

However, such differences in process speed have a great influence on image uniformity, as so revealed as a result of studies.

Where conventional conductive members are used, especially used as charging members, in such electrophotographic apparatus that can set a plurality of different process speed in one machine, the following problem may arise.

In the case of an electrophotographic apparatus having employed the system in which only direct-current voltage is applied to the conductive member as a charging member, even a charging member which can achieve good charging uniformity at, e.g., 94 mm/s (regular speed) may cause fine and short, white or black horizontal lines at, e.g., 31 mm/s (⅓ speed). This phenomenon tends to appear especially in a low-humidity environment. It has also been found that such white or black horizontal lines may greatly differ depending on the construction of the electrophotographic photosensitive members.

In the case of an electrophotographic apparatus having employed the system in which a voltage formed by superimposing an alternating-current voltage on a direct-current voltage is applied to the charging member, the charging uniformity can be dealt with by appropriate selection of the frequencies of the alternating-current voltage according to the process speed. However, the current leakage tends to occur especially on the low-speed side. This phenomenon tends to appear especially in a high-humidity environment.

Where the conductive member disclosed in Japanese Patent Applications Laid-open No. 2000-39755 and No. 2001-209235 is used, which has a single-layer (a layer of a high polymer with conductive fine particles dispersed therein) structure and in which the conductive fine particles have a lower (or substantially zero) distribution density at the contact part (the surface) and in the vicinity thereof, brought into contact with a contact object member, than at the other part thereof to control the electrical resistance, the following problem may also arise.

The conductive fine particles have the effect of lowering electrical resistance and at the same time have reinforcing properties. The fact that the conductive fine particles have a lower distribution density as they come in the vicinity of the contact part means that the layer has a smaller quantity of the conductive fine particles in the vicinity of the surface. As the result, the layer is less reinforced (has a lower strength) or has a lower hardness closer to the surface. This applies all the more when the quantity of the conductive fine particles is substantially zero.

More specifically, in this construction, the layer has a low hardness or a low strength at the surface and in the vicinity thereof, and hence the surface and the vicinity thereof are in the state in which they can wear easily.

To deal with this effect, a thickness of about 20 $\mu$m is substantially necessary as the lower limit. This, however, means that the matter is dealt with by controlling the thickness without overcoming the easiness of wear, and can not safely be said to be a fundamental improvement.

In particular, in the case of the electrophotographic apparatus that can set a plurality of different process speed in one machine, not only the static or dynamic state of contact, the torque, the state of rubbing friction, the state of application of voltage, and so forth, between the electrophotographic photosensitive member and the conductive member may change irregularly, but also how they correlate with each other may differ to an extent. Hence, various stresses tend to be applied to a greater extent than the case of the electrophotographic apparatus having a single process speed. As the result, the influence of such external factors on conductivity may become complicated and also the surface of the conductive member tends to wear more. This is very remarkable with rubbers.

Thus, although the conductive fine particles can be made to come off less because of wear of the surface of the conductive member, the surface itself may wear earlier and hence it follows that the performance at the initial stage is lost in a short time. In this regard, the above measures are unsuitable and insufficient for making the conductive member itself highly durable.

Moreover, if the surface and the vicinity thereof has worn to become lost, the conductive fine particles become bare from the interior, and hence the problem caused by the coming off of the conductive fine particles may arise. Also, the larger the thickness of the part where the quantity of the conductive fine particles is substantially zero, the more unfavorable it is for the charging uniformity of charging the electrophotographic photosensitive member uniformly and the more faulty images tend to occur. This tendency is remarkable in the electrophotographic apparatus in which only direct-current voltage is applied to the conductive member for charging of the electrophotographic photosensitive member.

SUMMARY OF THE INVENTION

An object of the present invention is to provide a conductive member which can contribute to the formation of good images over a long period of time even in an electrophotographic apparatus that can set a plurality of different process speeds in one machine so as to be adaptable to various kinds of media (transfer materials), and also can be used as a charging member to which only direct-current voltage is applied.

Another object of the present invention is to provide a process cartridge and an electrophotographic apparatus which have the above conductive member as a charging member.

As a result of repeated extensive studies, the present inventors have discovered that the above problems can be solved by controlling the average particle diameter of fine particles of the surface layer of the conductive member.

That is, the present invention provides a conductive member comprising a support and at least one cover layer provided thereon. The surface layer of the conductive member contains fine particles. In addition, in the surface layer of the conductive member, fine particles present at the surface-layer lower part corresponding to a range within 30% of the total layer thickness from the lowermost plane have an average particle diameter which is larger than the average particle diameter of fine particles present at the surface-layer upper part corresponding to a range within 30% of the total layer thickness from the uppermost plane.

The present invention also provides a process cartridge and an electrophotographic apparatus which have the above conductive member.

DESCRIPTION OF THE PREFERRED EMBODIMENTS

Figure 1:
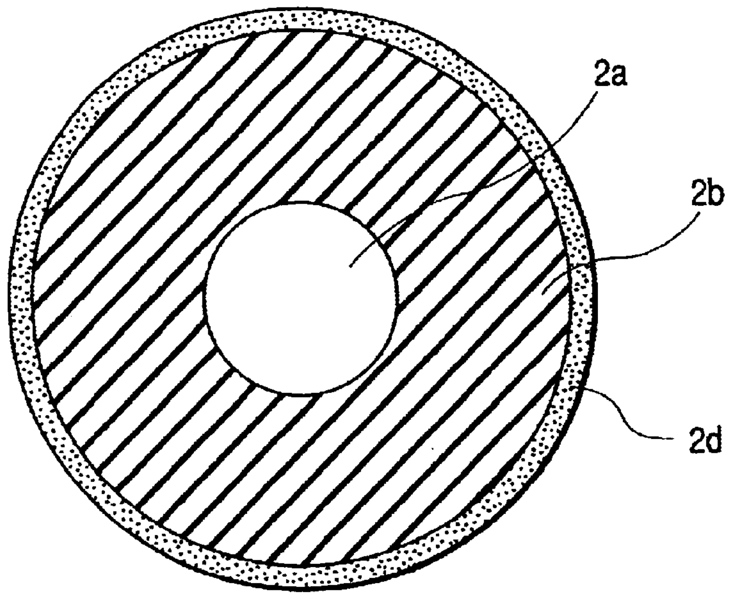
FIG. 1 is a schematic view showing an example of the conductive member of the present invention.

The present invention is described below in detail. It is described chiefly in the case of a charging member (one having the shape of a roller is herein often particularly called "charging roller"). The conductive member of the present invention is applicable not only to charging members, but also to various conductive members used in electrophotographic apparatus, such as developing members and transfer members.

The conductive member of the present invention comprises a support and provided thereon is at least one cover layer, and a surface layer, which is one of the cover layers of the conductive member, contains fine particles.

The fine particles of the surface layer of the conductive member may be of one kind or of two or more kinds. At least one kind thereof may be conductive fine particles and, in the case when two or more kinds of fine particles are used, insulating fine particles may be used. In the present invention, it is preferable to use the conductive fine particles and the insulating fine particles in combination; the latter being particles for controlling the electrical resistance of the conductive member.

In the present invention, the conductive fine particles are meant to be fine particles having a volume resistivity of less than $1\times10^{10}$ Ω·cm, and the insulating fine particles are meant to be fine particles having a volume resistivity of $1\times10^{10}$ Ω·cm or more.

In the surface layer of the conductive member of the present invention, fine particles present at the lower part of the surface layer (hereinafter "surface-layer lower part") have an average particle diameter which is larger than the average particle diameter of fine particles present at the upper part of the surface layer (hereinafter "surface-layer upper part").

In the present invention, the surface-layer lower part is the part corresponding to a range within 30% of the total layer thickness from the lowermost plane of the surface layer. The surface-layer upper part is the part corresponding to a range within 30% of the total layer thickness from the uppermost plane of the surface layer.

The fine particles the surface-layer lower part contains may preferably have an average particle diameter in the range of from 0.02 μm to 2.0 μm, and particularly preferably in the range of from 0.051 μm to 0.4 μm, and the fine particles the surface-layer upper part contains may preferably have an average particle diameter in the range of from 0.001 μm to 1.0 μm, and particularly preferably in the range of from 0.001 μm to 0.05 μm.

If the average particle diameter of the fine particles the surface-layer lower part contains and the average particle diameter of the fine particles the surface-layer upper part contains deviate from the above ranges, the effect of the present invention can not be obtained in some cases even if the average particle diameter of the fine particles in the surface-layer lower part is made larger than the average particle diameter of the fine particles in the surface-layer upper part.

The fine particles in the surface-layer lower part may also preferably be in a content larger than the content of the fine particles in the surface layer upper part. This is because a more remarkable effect can be obtained in regard to charging uniformity and improvement in pinhole leak-proofness.

Controlling the average particle diameter (preferably the content of fine particles also) of the fine particles can make the upper part of the surface layer of the conductive member have a higher electrical resistance than the lower part thereof, as so considered. By virtue of this difference in electrical resistance, electrical electric charges can be retained in the vicinity of the surface of the conductive member to prevent any excess feeding of electrical charges and conversely supplement any insufficient feeding of electrical charges, so that proper feeding of electrical charges can be ensured.

Moreover, any pinhole leak levels at a low process speed can be kept from becoming poor. This is because the ability to retain electrical charges in the vicinity of the surface of the conductive member acts effectively also on the prevention of a pinhole leak.

Furthermore, the conductive member can also be improved in its durability. Since in the surface-layer upper part of the conductive member, the fine particles having a smaller average particle diameter than the fine particles in the surface-layer lower part are present, the surface layer has higher reinforcing properties than that in a case in which any fine particles are not present at all or almost not present, bringing a dramatic improvement in durability, as so considered. Also, since the fine particles present in the vicinity of the surface of the conductive member have a smaller average particle diameter, this is very effective also for preventing the fine particles from coming off.

The fine particles contained in the whole surface layer of the conductive member may preferably have particle diameters in the range of from 0.001 μm to 2 μm. If the fine particles have a particle diameter smaller than 0.001 μm, they may come not to contribute to the providing of conductivity (conductive fine particles) or the controlling of conductivity (insulating fine particles). If, on the other hand, the fine particles have a particle diameter larger than 2 μm, in the case of the conductive fine particles, they may provide so excessively low an electrical resistance there that electrical charges tend to flow there concentratedly to make pinhole leak levels poor. In the case of the insulating fine particles, they may come not to contribute to the controlling of conductivity.

How to form the surface layer of the conductive member of the present invention is described below.

As a method of forming the surface layer, it is preferable to use a method in which a binder material is dissolved and the fine particles are dispersed therein to prepare a coating fluid and this is coated by dipping or the like to form the surface layer.

The conductive member of the present invention is, as described above, the conductive member comprising a support and provided thereon at least one cover layer, and is characterized in that, of the cover layer(s), a layer corresponding to the surface layer of the conductive member contains the fine particles and that the fine particles present at the surface-layer lower part have an average particle diameter which is larger than the average particle diameter of fine particles present at the surface-layer upper part.

In order to control the average particle diameter of the fine particles in the surface layer of the conductive member in this way, it is preferable to use in combination at least two kinds of fine particles having different average particle diameters. The at least two kinds of fine particles having different average particle diameters may be those comprised of the same material, but having different average particle diameters, or may be those comprised of different materials having different average particle diameters.

As a sure method by which the fine particles are made to differ in average particle diameter between the surface-layer lower part and the surface-layer upper part of the conductive member, the following method is available. When, e.g., the surface layer is formed by a coating process such as dipping, a plurality of (at least two) coating fluids in each of which the fine particles having different average particle diameters have been dispersed are prepared, and these coating fluids containing the fine particles having different average particle diameters are coated dividedly in several steps (at least two steps), followed by drying the resulting coatings (wet coatings) simultaneously to form the surface layer.

One and the same coating fluid may also be used, where a method is available in which coating is divided into several steps (at least two steps) and the coating fluid is allowed to stand in each step, controlling the time therefor. This method is a method in which the average particle diameter is controlled by utilizing the action that, when the coating fluids are allowed to stand for a long time, particles having a large average particle diameter, particles having poor dispersibility, or particles having a large specific gravity settle down and the average particle diameter becomes different for each portion of the coating fluid which forms the surface layer.

In the case of dipping, in order to make the layer thickness uniform in the lengthwise direction, it is preferable to change the rate or speed at the time of drawing-up appropriately (the rate or speed at the time of plunging has not especially anything to do with the control of layer thickness).

When the surface layer is formed by coating through several steps, the binder materials to be dissolved in the coating fluids may preferably be of the same type. As long as binder materials of the same type are used in the coating fluids, the surface layer thus formed can be formed in a single layer. In other words, if binder materials of different types are used in the coating fluids, an interface may be produced between coatings not to make the surface layer a single layer.

Also, when the fine particles are made to differ in content between the surface-layer lower part and the surface-layer upper part of the conductive member, this can surely be achieved by a method similar to the above, namely, by a method in which coating fluids different in content of the fine particles are coated dividedly in several steps, followed by drying the resulting coatings (wet coatings) simultaneously to form the surface layer.

The content may also be controlled in the same way also when, as described above, one and the same coating fluid is used and the time for which it is allowed to stand is controlled.

To control the average particle diameter of the fine particles in the surface layer of the conductive member, in addition to the above methods, it is also effective to change the dispersion conditions for coating fluids or the dispersion power of dispersion machines to make the fine particles differ in average particle diameter.

In order to improve the dispersibility of the fine particles, it is preferable to subject the fine particles to surface treatment.

In order to control the average particle diameter, it is an effective method to properly separately coat a coating fluid in which fine particles subjected to surface treatment have been dispersed and a coating fluid in which fine particles not subjected to surface treatment have been dispersed.

As the surface treatment, coupling treatment and fatty-acid treatment are available. The coupling treatment may include treatment with a silane coupling agent and/or a titanate coupling agent. The fatty-acid treatment may include treatment with an acid such as stearic acid.

The fine particles are also classified into the conductive fine particles and the insulating fine particles as described previously.

The conductive fine particles may include metal-oxide-type conductive fine particles, metal-type conductive fine particles, carbon black, and carbon-type conductive fine particles, any of which may be used alone or in combination of two or more.

The metal-oxide-type conductive fine particles may include fine particles of zinc oxide, tin oxide, indium oxide, titanium oxide (such as titanium dioxide and titanium monoxide) and iron oxide. As the metal-oxide-type conductive fine particles, some exhibit sufficient conductivity by themselves, and some do not. In order to make the conductive fine particles have sufficient conductivity, i.e., in order to make the conductive fine particles have a volume resistivity of less than $1\times10^{10}$ Ω·cm, a dopant may be added to these fine particles. In general, it is considered that fine metal oxide particles exhibit conductivity upon formation of excess electrons by virtue of the presence of lattice defects. Thus, the addition of a dopant accelerates the formation of the lattice defects, so that sufficient conductivity can be attained. For example, as a dopant for zinc oxide, aluminum is used; as a dopant for tin oxide, antimony is used; and as a dopant for indium oxide, tin is used. Also, the titanium oxide provided with conductivity may include titanium oxide coated with conductive tin oxide.

The metal-type conductive fine particles may include fine particles of silver, copper, nickel, zinc and so forth.

The carbon black may include acetylene black, furnace black and channel black.

The carbon-type conductive fine particles may include fine particles of graphite, carbon fiber, activated carbon and charcoal.

As the conductive fine particles, among these, it is particularly preferable to use metal-oxide-type conductive fine particles or carbon black. This is because these fine particles have characteristic features of good dispersibility in the binder material, such as resins, and their average particle diameter can be controlled by dispersion with ease.

The insulating fine particles may include, e.g., metal-oxide-type insulating fine particles, such as fine particles of silica, alumina, titanium oxide (such as titanium dioxide and titanium monoxide), zinc oxide, magnesium oxide, zirconium oxide and antimony trioxide; and barium sulfate, barium titanate, molybdenum disulfide, calcium carbonate, magnesium carbonate, dolomite, talc, caolin clay, mica, aluminum hydroxide, magnesium hydroxide, zeolite, wollastonite, diatomaceous earth, glass beads, bentonite, montmorillonite, asbestos, hollow glass balls, graphite, rice hulls, organometallic compounds and organometallic salts. Also usable are fine particles of known resins as exemplified by polyamide resins, silicone resins, fluorine resins, acrylic or methacrylic resins, styrene resins, phenolic resins, polyester resins, urethane resins, olefinic resins, epoxy resins, and copolymers, modified products and derivatives of any of these.

Of these, from the viewpoint of dispersibility in the binder material such as resins, it is particularly preferable to use metal-oxide-type insulating fine particles or fine resin particles.

When, for example, the conductive fine particles and the insulating fine particles are used in combination, those which are analogous in material may be used, e.g., the fine particles may be unified into the metal-oxide-type fine particles, or the insulating fine particles to be added may be made to be fine resin particles having chemically bonded moieties analogous to those of binder resins. This is preferable in order to control their dispersibility.

With regard to the control of conductivity, the charging uniformity and pinhole leak-proofness can further be improved when the binder material used in the surface layer of the conductive member has nitrogen atoms or carbon atoms in its structure. Nitrogen atoms and carbon atoms have unshared electron pairs in the atoms. It is considered that the presence of such electron pairs enhances the ability to retain electrical charges. Also, among carbon atoms, it is further effective to use, in particular, a binder material having a polarized structure like carboxyl groups. From this viewpoint, a material having a urethane linkage or an amide linkage may preferably be used in the binder material used in the surface layer of the conductive member.

The durability of the conductive member can also be improved when the surface layer is made to have a higher hardness. The conductive member of the present invention contains the fine particles in the surface layer, and hence has a higher hardness than a case in which it does not contain the fine particles. However, it is preferable to further employ a high-hardness material also in the binder material.

The conductive member may also preferably have an appropriate conductivity and elasticity in order to ensure the charging ability (charging performance) and the ability to make uniform close contact with other members coming into contact with it, e.g., the electrophotographic photosensitive member. From such a viewpoint, the conductive member may preferably additionally have an elastic layer between the support and the surface layer. The elastic layer may preferably have a hardness lower than the hardness of the surface layer.

More specifically, the conductive member may preferably be so constructed as to be functionally separated into the elastic layer, which is to ensure the charging ability and the ability to make uniform close contact with the electrophotographic photosensitive member, and the surface layer, which is to ensure the durability of the conductive member.

The surface of the conductive member may also preferably have a high releasability. Stated specifically, the surface layer of the conductive member may preferably contain a releasing material and also the binder material of the surface layer of the conductive member may preferably be a resin.

The fact that the surface layer has a high releasability means exactly that the surface layer has a small coefficient of friction. Thus, any contaminants can be made to less adhere to the surface of the conductive member, and also its durability can be improved. At the same time, the relative movement between the conductive member and other members, such as the electrophotographic photosensitive member, can be made smooth, and hence any irregular state of movement, such as a stick slip, can be made to occur less often. As the result, various phenomena, such as noise and irregular wear of the conductive member surface, which are considered to be caused by non-uniform rotation, can be prevented.

The fact that the surface layer has a high releasability also means that the conductive member may hardly contaminate other members coming into contact with it, e.g., the electrophotographic photosensitive member.

Where the releasing material is a liquid, it acts also as a smoothing agent (leveling agent) when the surface layer of the conductive member is formed, and hence the surface layer of the conductive member can be formed with a smooth finish.

The releasing material can be of various types and also is classified in different ways. Considered from the viewpoint of function, many materials are those which utilize low surface energy and those which utilize slidability. As to their states, they are available as liquids or as solids.

Those which are solids and have slidability are commonly known as solid lubricants. For example, those listed in KOTAI JUNKATSU HANDOBUKKU (Solid-Lubricant Handbook) (published by K. K. Yuki Shoboh; Second Edition, published on Mar. 15, 1982) may be used.

Compounds containing silicon atoms or fluorine atoms in the molecules may also be used in the form of oils or solids (releasing resins or powders, or polymers into part of which moieties having releasability have been introduced). The releasing materials may also include waxes and higher fatty acids (inclusive of salts or esters thereof and besides derivatives thereof).

Examples of layer the construction of the conductive member are shown in FIGS. 1 to 8.

FIG. 1 shows a conductive member having the shape of a roller. It is constituted of a support 2*a* having conductivity (i.e., a conductive support), another cover layer (elastic layer) 2*b* formed on the periphery of the support, and a cover layer (surface layer) 2*d* further formed on the periphery of the elastic layer.

Figure 2:
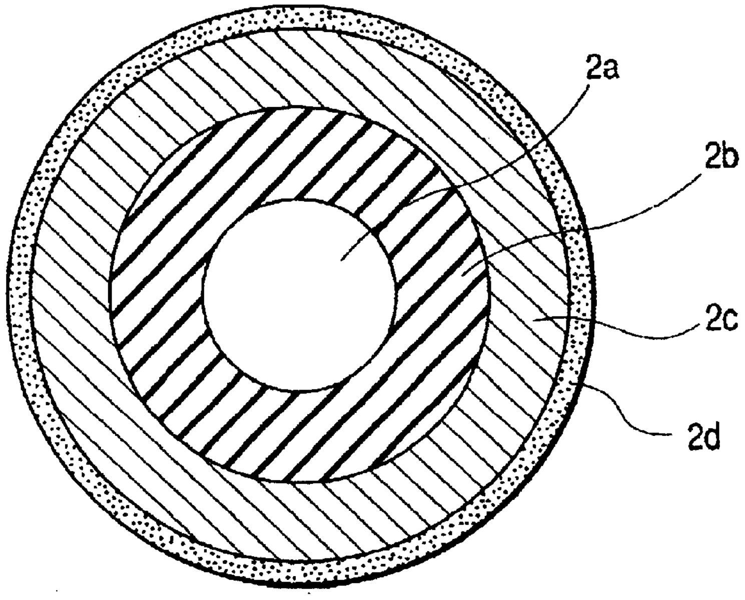
FIG. 2 is a schematic view showing another example of the conductive member of the present invention.
Figure 3:
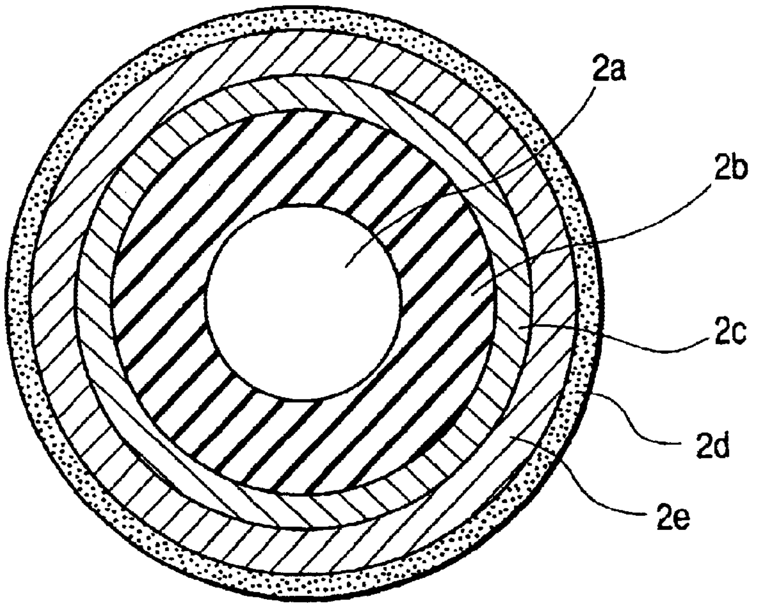
FIG. 3 is a schematic view showing still another example of the conductive member of the present invention.
Figure 4:
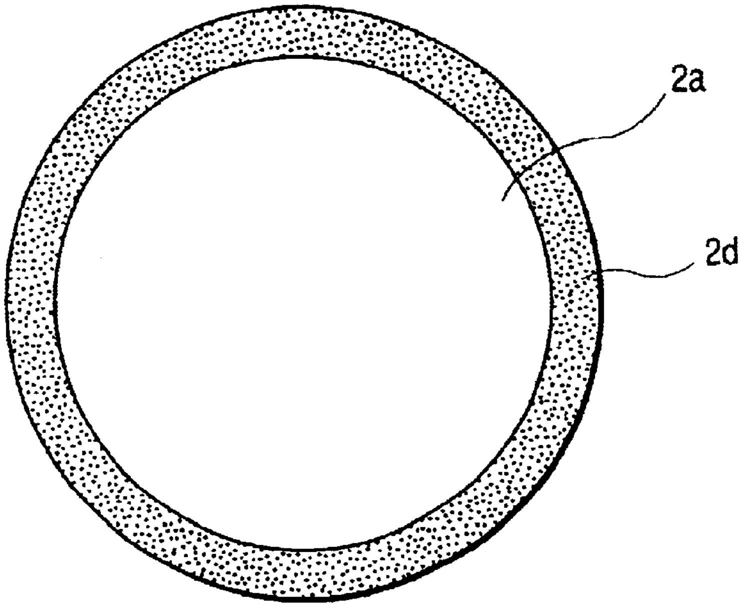
FIG. 4 is a schematic view showing a further example of the conductive member of the present invention.
Figure 5:
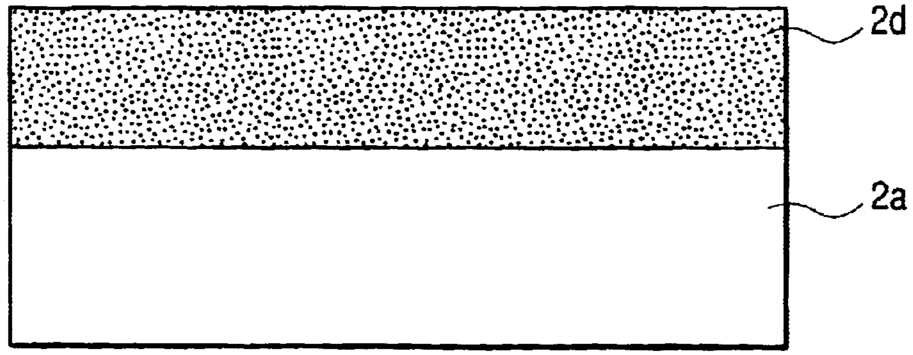
FIG. 5 is a schematic view showing a still further example of the conductive member of the present invention.
Figure 6:
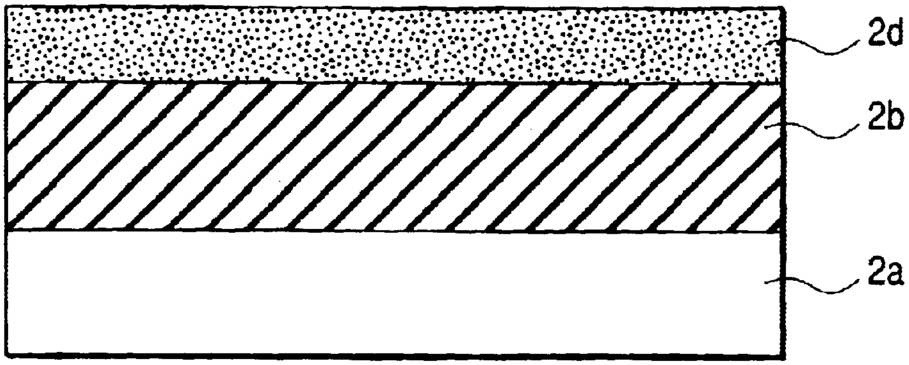
FIG. 6 is a schematic view showing a still further example of the conductive member of the present invention.
Figure 7:
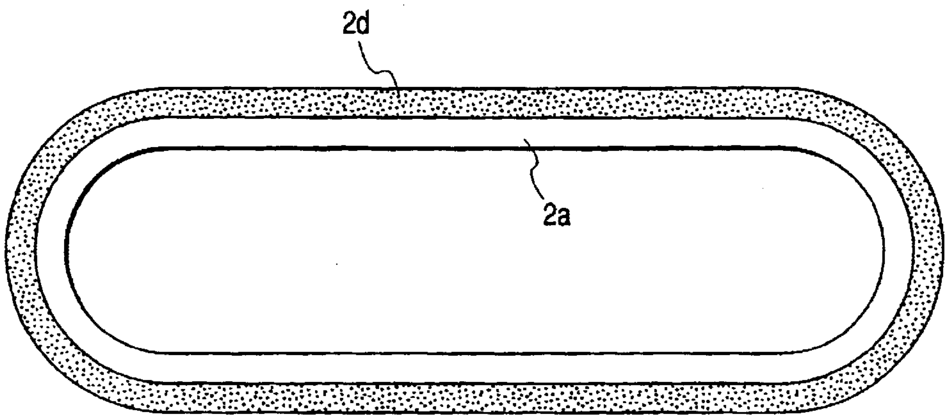
FIG. 7 is a schematic view showing a still further example of the conductive member of the present invention.
Figure 8:
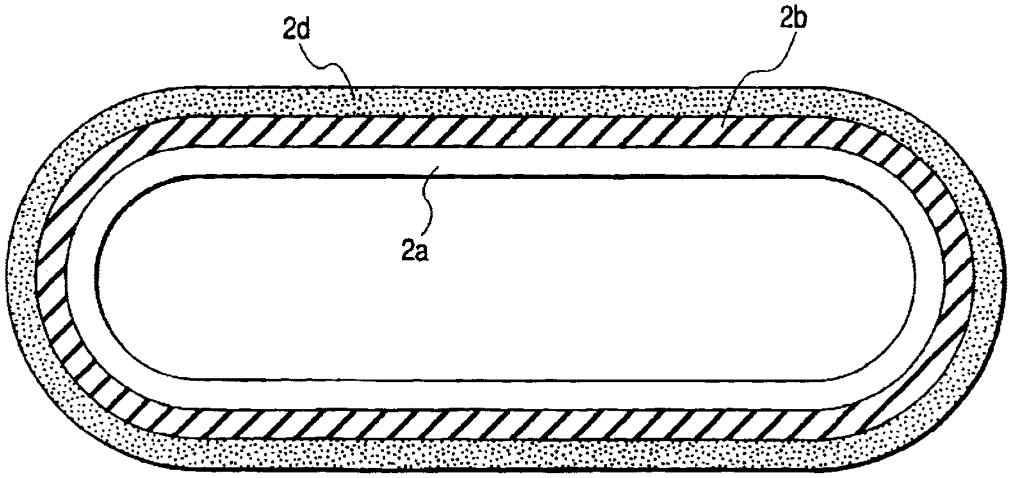
FIG. 8 is a schematic view showing a still further example of the conductive member of the present invention.

Other examples of construction are shown in FIGS. 2 to 4.

As shown in FIG. 2, the conductive member may have a triple-layer structure provided with another cover layer (resistance layer) 2c between the elastic layer 2b and the surface layer 2d. It may also have, as shown in FIG. 3, a four-layer structure provided with another cover layer (second resistance layer) 2e between the resistance layer 2c and the surface layer 2d, or may be provided with still another cover layer (resistance layer) to have a structure in which four or more cover layers are formed on the support 2a. It may still also have, as shown in FIG. 4, a single-layer structure in which only one cover layer corresponding to the surface layer is formed on the support 2a.

Without limitation to the roller shapes shown in FIGS. 1 to 4, the conductive member of the present invention may further be of various shapes, such as the shape of a sheet, the shape of a belt, the shape of a film and the shape of a plate, as shown in FIGS. 5 to 8. In regard to those having the respective shapes, the layer construction described above may be employed.

The binder material used to form the surface layer of the conductive member of the present invention may preferably be a resin or an elastomer, and may more preferably be a resin as mentioned above.

The resin may include fluorine resins, polyamide resins, acrylic resins, polyurethane resins, silicone resins, butyral resins, styrene-ethylene/butylene-olefin copolymers (SEBC) and olefin-ethylene/butylene-olefin copolymers (CEBC).

The elastomer may include natural rubbers (which may be vulcanized), synthetic rubbers and thermoplastic elastomers.

The synthetic rubbers may include EPDM (ethylene-propylene-diene-methylene rubber), SBR (styrene-butadiene rubber), silicone rubber, urethane rubber, IR (isoprene rubber), BR (butadiene rubber), NBR (nitrile-butadiene rubber) and CR (chloroprene rubber).

The thermoplastic elastomers may include polyolefin-type thermoplastic elastomers, urethane-type thermoplastic elastomers, polystyrene-type thermoplastic elastomers, fluorine-rubber-type thermoplastic elastomers, polyester-type thermoplastic elastomers, polyamide-type thermoplastic elastomers, polybutadiene-type thermoplastic elastomers, ethylene-vinyl acetate type thermoplastic elastomers, polyvinyl-chloride-type thermoplastic elastomers and chlorinated-polyethylene-type thermoplastic elastomers.

Any of these binder materials may be used alone, may be a mixture of two or more types, or may form a copolymer.

The surface layer 2d is endowed with conductivity by adding conductive fine particles. For the purposes of controlling conductivity, controlling surface properties, and improving reinforcing properties, it may further be incorporated with insulating fine particles and a different type of conductive fine particles. As these conductive fine particles and insulating fine particles, the fine particles described previously may be used.

These fine particles may also be those having been subjected to surface treatment, to modification, to the introduction of functional groups or molecular chains and to coating, which may be of various types.

The elastic layer 2b has an appropriate conductivity and elasticity in order to ensure the charging ability to charge the electrophotographic photosensitive member and the uniform close contact with other members coming into contact with it, such as the electrophotographic photosensitive member.

In the case when the conductive member has the shape of a roller, in order to ensure the good, uniform close contact of the conductive member with other members coming into contact with it, such as the electrophotographic photosensitive member, the roller may preferably be formed into what is called a crown, which is a shape having the largest diameter at the middle and diameters made smaller toward the both ends. It may be formed into the crown by, e.g., sanding the elastic layer 2b.

Since, commonly, the conductive member having the shape of a roller, such as the charging roller, is brought into contact with other members coming into contact with it, such as the electrophotographic photosensitive member, under the application of a stated pressure on both ends of the support 2a, the pressure is low at the middle and is larger toward the both ends. Hence, there is no problem, as long as the conductive member, having the shape of a roller, has a sufficient straightness. If, however, it has an insufficient straightness, it may cause charge non-uniformity between the middle and the both ends and, corresponding to this non-uniformity, may cause density non-uniformity in images. It is formed into the crown in order to prevent this result.

As materials (elastic materials) for the elastic layer 2b, any materials may be used as long as they are elastomers, such as synthetic rubbers and thermoplastic elastomers. As to the elastomers, the same elastomers as those described above may be used. A foam obtained by foam molding may also be used as the elastic material. Where it is necessary to ensure a nip between the conductive member and other members coming into contact with it, such as the electrophotographic photosensitive member (e.g., between the charging roller and the electrophotographic photosensitive member), a synthetic rubber material may preferably be used as the elastic material.

The elastic layer 2b may preferably be endowed with conductivity to have an electrical resistance adjusted to less than $10^8$ Ω·cm, by adding to the above elastic material the above conductive fine particles or insulating fine particles, or by adding thereto a conducting compound, such as an alkali metal salt or an ammonium salt, or by using these in combination. If the elastic layer 2b has an electrical resistance of $10^8$ Ω·cm or more, the conductive member may have a lower charging ability to make it unable to satisfy the charging uniformity for the electrophotographic photosensitive member.

The elasticity and hardness of the elastic layer 2b may be controlled by adding a softening oil, a plasticizer or the like or by foaming the elastic material.

The support 2a may at least have conductivity, and a metallic material such as iron, copper, stainless steel, aluminum or nickel may be used. For the purpose of providing resistance to scratching, the metal surface thereof may further be subjected to plating to such an extent that its conductivity is not damaged.

The surface layer 2d may preferably have an electrical resistance controlled to be higher than the electrical resistance of the elastic layer 2b and to be not higher than $10^{16}$ Ω·cm. If the surface layer 2d has an electrical resistance lower than that of the elastic layer 2b, it may be unable to prevent leakage due to pinholes and scratches of the electrophotographic photosensitive member surface. If it has an electrical resistance higher than $10^{16}$ Ω·cm, the conductive member (charging member) may have a lower charging ability to make it unable to satisfy the requirement for charging uniformity.

The conductive member may be provided with the resistance layer 2c at a position contiguous to the elastic layer 2b, in order that the softening oil or plasticizer contained in the elastic layer can be prevented from bleeding out to the conductive member surface.

As materials constituting the resistance layer 2*c*, the same materials as those used in the elastic layer 2*b* may be used. The resistance layer 2*c* may also preferably have conductivity or semiconductivity. As a material which provides conductivity, the above conductive fine particles of various types may be used. In this case, in order to achieve the desired electrical resistance, the above conductive fine particles of various types may be used in a combination of two or more.

The resistance layer 2*c* may preferably have an electrical resistance controlled to be not higher than the electrical resistance of the surface layer 2*d* and not lower than the electrical resistance of the elastic layer 2*b*. If its electrical resistance deviates from this range, it may be unable to satisfy the requirement for charging uniformity.

Besides the foregoing various materials, a material having a different function may appropriately be used in the elastic layer 2*b*, the surface layer 2*d* and the resistance layer 2*c*. Such a different material may include, in the case of, e.g., the elastic layer 2*b*, antiaging agents (antioxidants), such as 2-mercaptoimidazole, and lubricants, such as stearic acid and zinc stearate.

The elastic layer 2*b*, the surface layer 2*d* and the resistance layer 2*c* may also be subjected to surface treatment. The surface treatment may include surface processing treatment making use of ultraviolet rays or electron rays and a surface-modifying treatment in which a compound is made to adhere to the surfaces of the layers or the latter is impregnated with the former.

The electrical resistance (volume resistivity, unit: Ω·cm) of the elastic layer 2*b*, the surface layer 2*d* and the resistance layer 2*c* is measured with, e.g., a resistance measuring instrument, an insulation resistance meter HIRESTA-UP, manufactured by Mitsubishi Chemical Corporation.

With regard to the elastic layer 2*b*, the elastic layer material itself is molded into a sheet with a thickness of 2 mm, and 250 V of voltage is applied for 30 seconds in an environment of 23° C. and 55% RH to measure the volume resistivity.

With regard to the surface layer 2*d* and the resistance layer 2*c*, the same binder material as that used to form each layer is made into a coating fluid, and its clear coating fluid is coated on an aluminum sheet, where the volume resistivity of each layer is measured under the same conditions as those for the elastic layer 2*b*.

The elastic layer 2*b*, the surface layer 2*d*, and the resistance layer 2*c* may be formed by any method without any particular limitations as long as it is suited for forming each layer in the desired thickness (with regard to the surface layer, a preferable method of forming it has been described above). Known methods concerning layer formation, making use of polymeric materials, such as resins, may be employed.

These layers may each be formed by bonding a sheetlike or tubelike layer formed previously in a stated thickness, or by covering with the same, or may be formed by, or according to, a conventionally known method, such as electrostatic spraying or dipping.

A method may also be used in which the layers are roughly formed by extrusion and thereafter their shapes are adjusted, or a method in which materials are cured into a stated shape in a mold, followed by forming.

The elastic layer 2*b* may preferably have a layer thickness of 0.5 mm or more. If the elastic layer has a layer thickness of less than 0.5 mm, the elastic layer can not have appropriate elasticity, so that its contact with the electrophotographic photosensitive member may become improper to make the conductive member (charging member) not satisfy the requirement for charging uniformity.

The surface layer 2*d* may preferably have a layer thickness of from 1 μm to 1,000 μm. If the surface layer has a layer thickness of less than 1 μm, it tends to have a non-uniform layer thickness, and any unevenness of the elastic layer may appear as it is to the surface of the conductive member to make the conductive member (charging member) not satisfy the requirement for charging uniformity. At the same time, since the surface of the conductive member stands rough (greatly uneven), toner particles and external additives may come to tend to adhere to the conductive member surface. If, on the other hand, the surface layer is thicker than 1,000 μm, the appropriate elasticity given to the elastic layer may be lost, so that its contact with the electrophotographic photosensitive member may become improper, to make the conductive member (charging member) not satisfy the requirement for charging uniformity.

The resistance layer 2*c* may also preferably have a layer thickness of from 1 μm to 1,000 μm.

To measure the layer thickness of the elastic layer 2*b*, the surface layer 2*d* and the resistance layer 2*c*, layer sections are observed with an optical microscope and their thickness is actually measured. Stated specifically, the conductive member is cut with a cutting knife, and its cut section is observed on an optical or electron microscope and the thickness of each layer is measured.

In the present invention, as to the particle diameter and average particle diameter of the fine particles, 100 particles are picked up at random under observation on a TEM (transmission electron microscope), and the space between two horizontal lines which hold fine particles between them is regarded as the particle diameter of the particles, and its number-based average is regarded as the average particle diameter.

In the present invention, as to also the content of the fine particles contained in the surface layer (surface-layer lower part and surface-layer upper part), the area where the fine particles are present is calculated under observation by the transmission electron microscope, and the proportion of the area where the fine particles are present that is held in the whole area is regarded as their content.

In the present invention, as to still also the volume resistivity of the fine particles, the value measured by connecting MCP-PD41 to LORESTA-GP or HIRESTA-UP (all manufactured by Mitsuishi Chemical Corporation) is regarded as the volume resistivity of the fine particles. The quantity of a sample therefor may preferably appropriately be adjusted according to the density or the like of the fine particles. In the present invention, 1.5 g of the sample is weighed in regard to tin oxide, and 0.5 g in regard to carbon black, where the applied pressure is set constant at 10.1 MPa (102 kgf/$cm^2$). The applied voltage is fixed at 10 V when measured with LORESTA-GP. When measured with HIRESTA-UP, since the regions of resistance to be measured differ depending on the applied voltage, the applied voltage is appropriately changed in accordance with the resistance value to be measured.

As to further the hardness of the elastic layer and the surface layer, the value of the microhardness measured with a microhardness meter MD-1 (manufactured by Kohbunshi Keiki K. K.) is regarded as the hardness. The microhardness is what is found when an indenter point (reverse-conical) of 0.16 mm in diameter at the root and 0.5 mm in length is pressed against a sample and the amount of indentation (displacement) of the indenter point at the time of pressing is indicated as the hardness value. This enables measurement of the hardness of the surface and its vicinity of the conductive member. Hence, the hardness of materials used in the respective layers can be measured more faithfully. The measurement is also made in a peak-hold mode in an environment of 23° C./55% RH. Stated in greater detail, in the case of the elastic layer, a sample is molded in the same manner as the sheet sample used to measure the electrical resistance and a measuring terminal is precisely pressed against it, where the value after 5 seconds is read. This is repeated several times, and its average value is regarded as elastic-layer hardness in the present invention. In the case of the surface layer, it is difficult to mold the material into a sheet of 2 mm thick. Accordingly, four sheets of 0.5 mm thick are prepared, and these are superposed together to make a sheet sample of 2 mm thick. The value measured in the same manner as the elastic layer is regarded as the surface layer hardness in the present invention.

The construction of the process cartridge and the electrophotographic apparatus of the present invention is described below.

Figure 12:
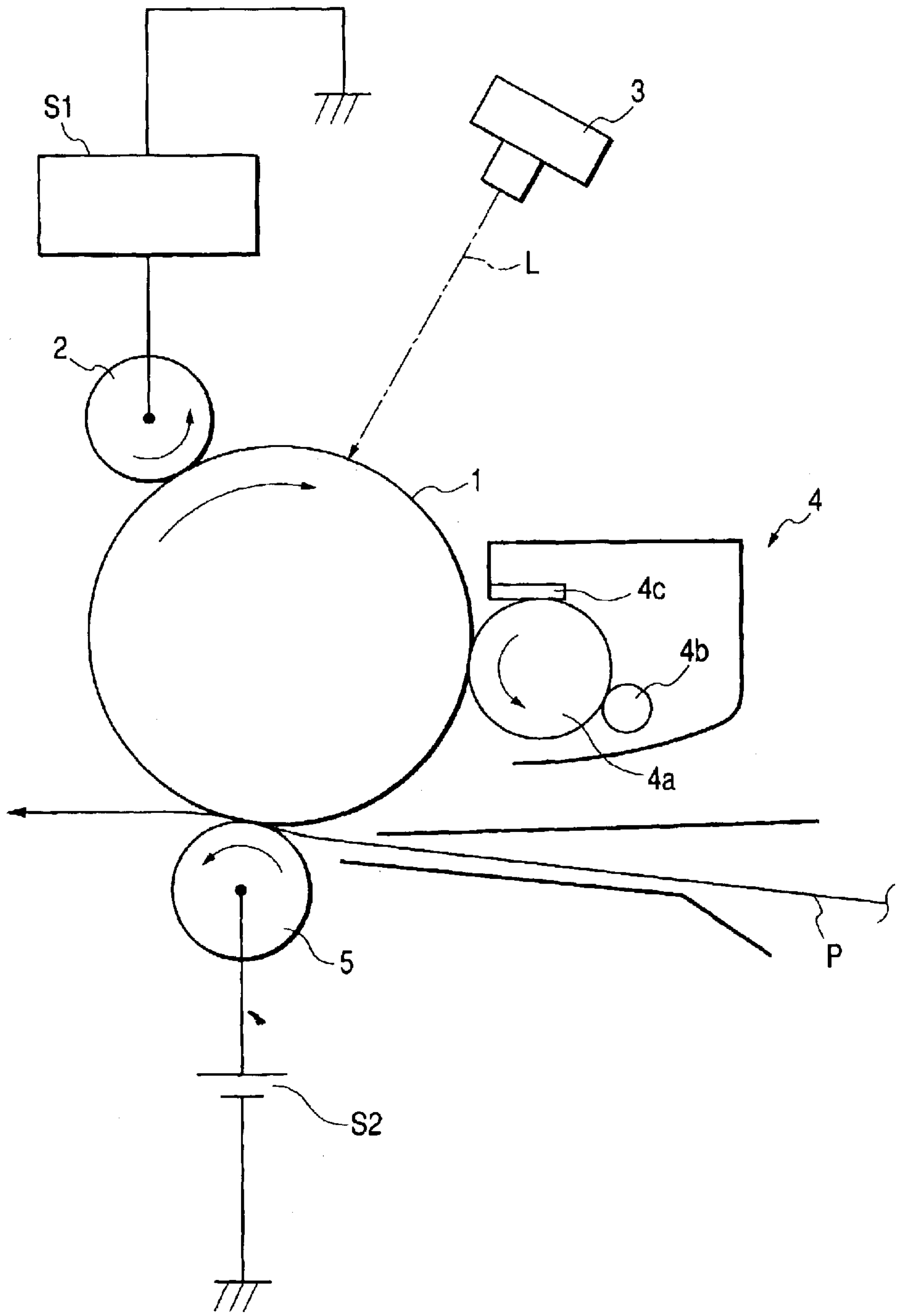
FIG. 12 is a schematic view showing an example of the construction of an electrophotographic apparatus according to the present invention.

FIG. 12 is a schematic illustration of the construction of the electrophotographic apparatus of the present invention.

The electrophotographic apparatus shown in FIG. 12 is an apparatus of a reverse-development system utilizing transfer-type electrophotography, and is an apparatus having employed the conductive member of the present invention as a charging member.

Reference numeral 1 denotes a rotating-drum type electrophotographic photosensitive member. This electrophotographic photosensitive member 1 is rotatingly driven at a stated peripheral speed (process speed) in the clockwise direction as shown by an arrow in the drawing. The process speed is set variable. As the electrophotographic photosensitive member 1, a known electrophotographic photosensitive member may be employed which has a cylindrical support having conductivity and provided on this support is a photosensitive layer containing an inorganic photosensitive material or an organic photosensitive material.

The electrophotographic photosensitive member 1 may further have a charge injection layer for charging the electrophotographic photosensitive-member surface to the stated polarity and potential.

Reference numeral 2 denotes a charging roller serving as the charging member (the conducting member of the present invention). The charging roller 2 and a charging-bias-applying power source S1 which applies a charging bias to the charging roller 2 constitute a charging means. The charging roller 2 is kept in contact with the electrophotographic photosensitive member 1 under a stated pressure. In this apparatus, it is rotatingly driven in a direction following the rotation of the electrophotographic photosensitive member 1. Only a stated DC voltage (in this example, set at −1,200 V) is applied to this charging roller 2 from the charging-bias-applying power source S1, and thus the surface of the electrophotographic photosensitive member is electrostatically uniformly charged to the stated polarity and potential (in this example, set at a dark-area potential of −600 V).

Reference numeral 3 denotes an exposure means. A known means may be used as the exposure means 3. For example, a laser beam scanner is available. Concerning the electrophotographic photosensitive member 1, the surface to be charged is exposed to laser light L corresponding to the intended image information, which is exposed through the exposure means 3, so that the surface potential (set at a light-area potential of −350 V) of the electrophotographic photosensitive member at exposed light areas of the charged surface decreases (attenuates) selectively and an electrostatic latent image is formed on the electrophotographic photosensitive member 1.

Reference numeral 4 denotes a developing means. A known means may be used as the developing means. For example, the developing means 4 in this example is so constructed as to have i) a toner-carrying member 4$a$, which is provided at an opening of a developing container holding a toner, and carries and transports the toner, ii) an agitation member 4$b$ which agitates the toner held in the developing container and iii) a toner control member 4$c$ which controls (regulates) the quantity of the toner held on the toner-carrying member 4$a$ (i.e., toner layer thickness). In the developing means 4, a toner (a negative toner) standing charged electrostatically (in this example, at a development bias of −350 V) to the same polarity as the charge polarity of the electrophotographic photosensitive member 1 is made to adhere selectively to the exposed light areas of the electrostatic latent image on the electrophotographic-photosensitive-member surface to render the electrostatic latent image visible as a toner image. As its developing system, there are no particular limitations, and an existing system may be used. The existing system may include, e.g., a jumping developing system, a contact developing system and a magnetic-brush developing system. Especially in a full-color electrophotographic apparatus which reproduces full-color images, the contact developing system is preferred in order to, e.g., prevent the toner from scattering. As the toner-carrying member 4$a$, used in the contact developing system, it may preferably contain a compound having an elasticity such as rubber, from the viewpoint of ensuring contact stability. For example, a developing roller having a support made of a metal or the like and an elastic layer endowed with conductivity that is provided thereon may be used. This elastic layer may be formed using as an elastic material a foam obtained by foam molding. An additional layer may also be provided thereon, or the layer may be subjected to surface treatment. The surface treatment may include a surface-processing treatment making use of ultraviolet rays or electron rays and a surface-modifying treatment in which a compound is made to adhere to the layers or the latter is impregnated with the former.

Reference numeral 5 denotes a transfer roller functioning as a transfer means. A known means may be used as the transfer roller 5. For example, a transfer roller having a support made of a metal or the like and covered thereon with an elastic resin layer controlled to have medium resistance may be used. The transfer roller 5 is kept in contact with the electrophotographic photosensitive member 1 under a stated pressure to form a transfer nip, and is rotated in the direction following the rotation of the electrophotographic photosensitive member 1 at a peripheral speed substantially equal to the peripheral speed of the rotation of the electrophotographic photosensitive member 1. Also, a transfer voltage having the polarity opposite to the charge polarity of the toner is applied from a transfer bias-applying power source S2. A transfer material P is fed at a stated timing from a paper-feed-mechanism section (not shown) to the transfer nip, and is charged on its back, to the polarity opposite to the charge polarity of the toner by means of a transfer roller 5 to which a transfer voltage is kept applied, whereby the toner image on the side of the electrophotographic photosensitive member 1 surface is electrostatically transferred to the surface side of the transfer material P at the transfer nip.

The transfer material P to which the toner image has been transferred at the transfer nip is separated from the surface of the electrophotographic photosensitive member 1, and is guided into a toner image fixing means (not shown), where the toner image is subjected to fixing. Then, the image-fixed transfer material is put out as image-formed matter. In the case of a double-side, image-forming mode or a multiple-image-forming mode, this image-formed matter is guided into a recirculation-delivery mechanism (not shown) and is again guided to the transfer nip.

Residues on the electrophotographic photosensitive member 1, such as transfer residual toner, are collected from the surface of the electrophotographic photosensitive member 1 by a cleaning means (not shown) which is of, e.g., a blade type. Thereafter, the surface of the electrophotographic photosensitive member 1 is again electrostatically charged by the charging roller 2, and images are repeatedly formed.

The electrophotographic apparatus in this example may be an apparatus having a process cartridge (not shown) which is so constructed that the electrophotographic photosensitive member 1 and the charging roller 2 are integrally supported by a supporting member, such as a resin molded member, and is, in the state of this integral construction, set detachably mountable to the body of the electrophotographic apparatus. It may also be a process cartridge in which not only the electrophotographic photosensitive member 1 and the charging roller 2, but also the developing means 4, the transfer-means transfer roller 5 and so forth are integrally supported together.

The present invention is described below in greater detail by giving Examples.

EXAMPLE 1

A charging roller was produced in the following way.

| | (by weight) |
|---|---|
| Epichlorohydrin rubber terpolymer (epichlorohydrin: ethylene oxide:allyl-glycidyl ether = 40 mol %:56 mol %: 4 mol %) | 100 parts |
| Light-duty calcium carbonate | 30 parts |
| Aliphatic polyester type plasticizer | 10 parts |
| Stearic acid | 1 part |
| Antioxidant MB (2-mercaptobenzimidazole) | 0.5 part |
| Zinc oxide | 5 parts |
| Quaternary ammonium salt (having structure represented by the following formula) | 2 parts. |

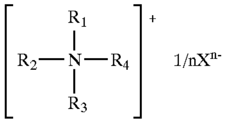

$R_1 = CH_3(CH_2)_6CH_2$
$R_2 = CH_3$
$R_3 = CH_3$
$R_4 = CH_2CH_2OH$
$X = ClO_4$
$n = 1$

The above materials were kneaded for 10 minutes by means of an enclosed mixer adjusted to 50° C., to prepare a raw-material compound. To this compound, based on 100 parts by weight of the raw-material epichlorohydrin rubber, 1 part by weight of sulfur as a vulcanizing agent, and as vulcanization accelerators 1 part by weight of DM (dibenzothiazyl sulfide) and 0.5 part by weight of TS (tetramethylthiuram monosulfide) were added, and these were kneaded for 10 minutes by means of a twin-roll mill kept cooled to 20° C. The compound thus obtained was extruded by means of an extruder onto a stainless-steel mandrel of 6 mm in diameter so as to be made into a roller of 15 mm in outer diameter, which was then vulcanized by heating with steam, followed by sanding so as to come to 12 mm in outer diameter to form the elastic layer 2*b*. The roller was of a length of 232 mm.

The surface layer 2*d* was formed on the elastic layer to cover it. The surface layer 2*d* was formed by coating the following surface layer coating fluids by dipping. The dipping was carried out twice.

First, as a coating fluid for first-time dipping, a liquid mixture was prepared in a container glass bottle, using the following materials.

| | (by weight) |
|---|---|
| Caprolactone-modified acryl-polyol solution | 100 parts |
| Methyl isobutyl ketone | 250 parts |
| Conductive fine tin oxide particles (product treated with trifluoropropyltrimethoxysilane; average particle diameter: 0.05 μm; volume resistivity: 103 Ω · cm) | 130 parts |
| Hydrophobic fine silica particles (product treated with hexamethyldisilazane; average particle diameter: 0.012 μm; volume resistivity: $10^{16}$ Ω · cm) | 3 parts |
| Modified dimethylsilicone oil | 0.08 part |

Into this container, as dispersion media, glass beads (average particle diameter: 0.8 mm) were so packed as to be in a packing of 80% , followed by dispersion for 8 hours using a paint shaker dispersion machine. To the resulting liquid dispersion, a 1:1 mixture of hexamethylene diisocyanate (HDI) butanone oxide block product and isophorone diisocyanate butanone oxide block product (IPDI) was so added as to be NCO/OH=1.0 to prepare the coating fluid for first-time dipping. Thus, the coating fluid for first-time dipping was prepared.

Subsequently, as a coating fluid for second-time dipping, a coating fluid was prepared in the same manner as the coating fluid for first-time dipping but using as the fine particles the following particles instead and changing the paint-shaker dispersion time to 16 hours.

| | (by weight) |
|---|---|
| Conductive fine tin oxide particles (product treated with trifluoropropyltirmethoxysilane; average particle diameter: 0.02 μm; volume resistivity: $10^3$ Ω · cm) | 100 parts |
| Hydrophobic fine silica particles (product treated with hexamethyldisilazane; average particle diameter: 0.012 μm; volume resistivity: $10^{16}$ Ω · cm) | 10 parts |

On the surface of the above elastic layer, the above surface-layer coating solutions were coated by dipping carried out twice. As to draw-up speed, the initial speed was set at 16 mm/s, and thereafter the speed was linearly reduced at a rate 1.125 mm/s per second. First, the coating fluid for first-time dipping was coated, followed by air drying at normal temperature for 10 to 30 minutes. Then, the roller was reversed, and the coating fluid for second-time dipping was coated in the same manner as the coating fluid for first-time dipping, followed by air drying at normal temperature for 30 minutes or more, and subsequently drying in a circulating hot air dryer at 160° C. for 1 hour. The surface layer having been dried had a layer thickness of 15 μm.

On the charging roller thus produced, measurement was made on the following items.

Average particle diameter and content of fine particles in surface layer:

A section (inclusive of the surface layer) of the charging roller was cured with an acrylic resin, and this was cut with a microtome to prepare slices for transmission-electron-microscope photography. A transmission-electron-microscope photograph of this sample was taken and observed to determine the average particle diameter by the method described previously.

The average particle diameter and content of the fine particles in the surface-layer lower part and the surface-layer upper part of the charging roller of this Example are shown in Table 1.

Figure 9:
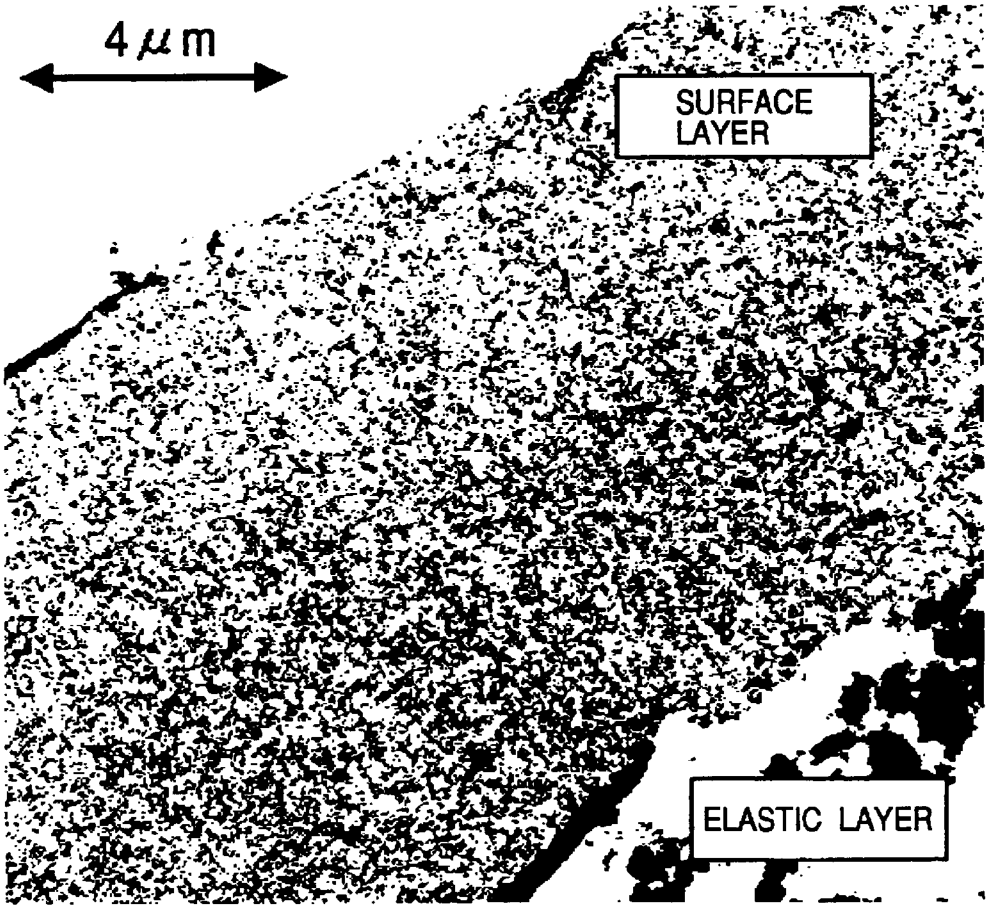
FIG. 9 is a view showing an electron microscope photograph of a surface layer at its cross section of the total thickness in the conductive member of the present invention.
Figure 10:
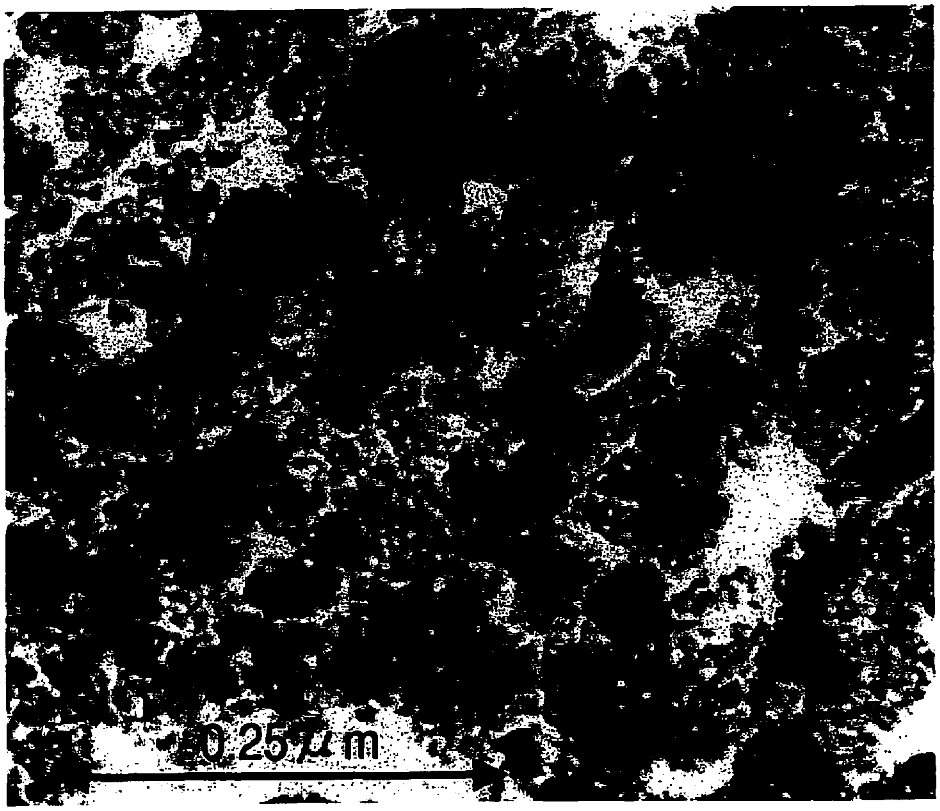
FIG. 10 is a view showing an electron microscope photograph of the surface-layer lower part in the conductive member of the present invention.
Figure 11:
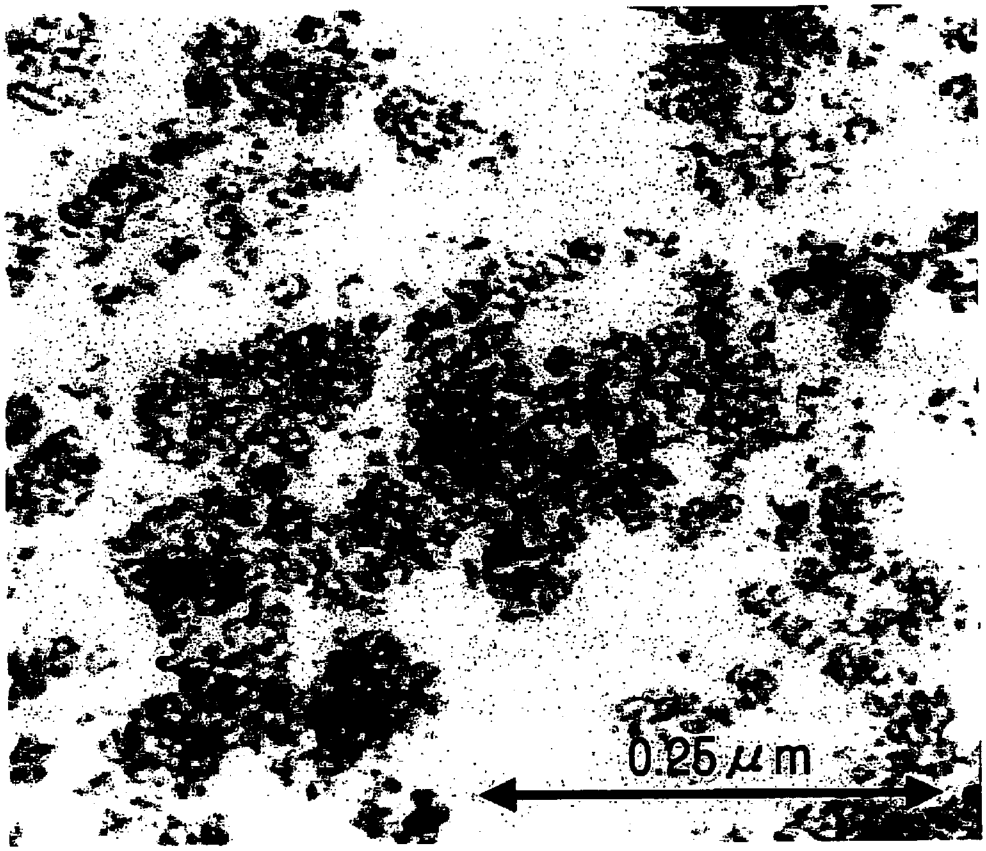
FIG. 11 is a view showing an electron microscope photograph of the surface-layer upper part in the conductive member of the present invention.

Part of the transmission-electron-microscope photograph used to determine the average particle diameter and content is shown in FIGS. 9 to 11. FIG. 9 shows how the surface layer stands in its total layer thickness; FIG. 10 shows the surface-layer lower part; and FIG. 11, shows the surface-layer upper part.

Measurement of hardness of elastic layer and surface layer:

The hardness of the elastic layer and the surface layer were measured by the method described previously.

The hardness of the elastic layer was found to be 50°.

With regard to the surface layer, the hardness of the sheet sample prepared using the coating fluid for first-time dipping was 90° and the hardness of the sheet sample prepared using the coating fluid for second-time dipping was 95°; both being higher than the hardness 50° of the elastic layer. Thus, the hardness of the whole surface layer can be deemed to be higher than the hardness of the elastic layer.

Evaluation of charging uniformity in applying only DC voltage to charging roller:

The above charging roller was set in the electrophotographic apparatus constructed as shown in FIG. 12, and halftone images were reproduced in each environment of Environment 1 (temperature: 23° C.; relative humidity: 55%), Environment 2 (temperature: 32.5° C.; relative humidity: 80% ) and Environment 3 (temperature: 15° C.; relative humidity: 10% ). The electrophotographic apparatus used in this Example was drivable at process speeds of 94 mm/s and 30 mm/s. Here, the images were reproduced also controlling the applied voltage in each environment in such a way that the surface potential $V_D$ of the electrophotographic photosensitive member 1 came to −600 V.

The results are shown in Table 1.

In Table 1, image levels are ranked as follows: Rank 1: very good; Rank 2: good; Rank 3: line-like and dot-like image defects are slightly seen on halftone images; and Rank 4: line-like and dot-like image defects are conspicuous.

Evaluation of pinhole leak-proofness of charging roller:

Pinholes of 0.1 mm in diameter and 0.2 mm in diameter were made at the surface of the electrophotographic photosensitive member, and this electrophotographic photosensitive member and the above charging roller were set in the electrophotographic apparatus constructed as shown in FIG. 12, and halftone images were reproduced in each environment in the same manner as in the evaluation of charging uniformity. To the charging roller, a voltage formed by superimposing an AC voltage on a DC voltage was applied (DC: −600 V; AC: frequency of 1,000 Hz and VPP (peak-to-peak voltage) of 1,800 V).

The results are shown in Table 1.

In Table 1, image levels are ranked as follows: Rank 1: no leak is seen on halftone images; Rank 2: leak images of 3 mm or less in diameter are seen on both sides of the pinhole of 0.1 mm in diameter; Rank 3: leak images are seen at the pinhole of 0.1 mm in diameter; and Rank 4: leak images are seen at the pinhole of 0.2 mm in diameter.

Evaluation of running performance (durability) in applying only DC voltage to charging roller:

After the above charging uniformity and pinhole leak-proofness were evaluated, a continuous 10,000-sheet image-reproduction runing test was conducted in each environment. The images formed were visually observed to evaluate the running performance of the charging roller. In this evaluation, the wearing characteristics and initial-function maintenance ability of the charging roller can be evaluated by examining the images.

The results are shown in Table 2.

In Table 2, image levels are ranked as follows: Rank 1: no changes from initial-stage images; Rank 2: coarse images (due to slight wear) are slightly seen in halftone images; Rank 3: coarse images and dots (due to slight coming-off of fine particles which is caused by wear) appear slightly in halftone images; and Rank 4: coarse images and dots appear in halftone images.

EXAMPLE 2

As to the charging roller in this Example, the elastic layer was formed in the same manner as in Example 1.

The surface layer **2*d* was formed on the elastic layer to cover it. The surface layer 2*d*** was formed by coating the following surface layer coating fluid by dipping. The dipping was carried out three times.

First, as a coating fluid for first-time dipping and second-time dipping, a liquid mixture was prepared in a container glass bottle, using the following materials as materials for the surface layer **2*d***.

| | (by weight) |
|---|---|
| Caprolactone-modified acryl-polyol solution | 100 parts |
| Methyl isobutyl ketone | 350 parts |
| Conductive fine tin oxide particles (product treated with hexyltrimethoxysilane; average particle diameter: 0.10 μm; volume resistivity: 35 Ω · cm) | 220 parts |
| Modified dimethylsilicone oil | 0.02 part |

Into this container, as dispersion media, glass beads (average particle diameter: 1.0 mm) were so packed as to be in a packing of 70% , followed by dispersion for 7 hours using a paint-shaker dispersion machine. To the resulting liquid dispersion, a 3:1 mixture of hexamethylene diisocyanate (HDI) butanone oxime block product and isophorone diisocyanate (PDD) butanone oxime block product was so added as to have NCO/OH=1.1 to prepare the coating fluid for first-time dipping and second-time dipping.

Subsequently, as a coating fluid for third-time dipping, a coating fluid was prepared in the same manner as the coating fluid for first-time dipping and second-time dipping but using as the fine particles the following particles instead, changing the dispersion-media glass beads for those having an average particle diameter of 0.8 μm and changing the paint-shaker dispersion time to 25 hours.

| | (by weight) |
|---|---|
| Conductive fine tin oxide particles (product treated with hexyltrimethoxysilane; average particle diameter: 0.02 μm; volume resistivity: 20 Ω · cm) | 100 parts |

On the surface of the above elastic layer, the above surface-layer coating solutions were coated by dipping carried out three times. In the first-time dipping and second-time dipping, the draw-up speed was fixed to 7 mm/s. First, the coating fluid for first-time dipping was coated, followed by air drying at normal temperature for 10 to 30 minutes. Then, the roller was reversed, and the coating fluid for second-time dipping, the same coating fluid as the coating fluid for first-time dipping, was coated in the same manner. Thereafter, this was air-dryed at a normal temperature for 10 to 30 minutes, and then the coating fluid for third-time dipping was coated. In the third-time dipping, the coating fluid was coated changing the draw-up speed in the same manner as in Example 1. The coating thus carried out was followed by air drying at a normal temperature for 30 minutes or more, and subsequently drying in a circulating hot air dryer at 160° C. for 1 hour. The surface layer having been dried had a layer thickness of 25 μm.

On the charging roller thus produced, the average particle diameter and content of the fine particles in the surface layer were measured in the same manner as in Example 1. The results are shown in Table 1.

The hardness of the sheet sample prepared using the coating fluid for first-time dipping and second-time dipping was 89° and the hardness of the sheet sample prepared using the coating fluid for third-time dipping was 86°; both being higher than the hardness 50° of the elastic layer. Thus, the hardness of the whole surface layer can be deemed to be higher than the hardness of the elastic layer.

On the charging roller of this Example, the same evaluation as that in Example 1 was also made. The results are shown in Tables 1 and 2.

EXAMPLE 3

As to the charging roller in this Example, the elastic layer was formed in the same manner as in Example 1.

The surface layer 2_d_ was formed on the elastic layer by carrying out dipping twice. The surface layer 2_d_ was formed using twice the same one as the coating fluid for first-time dipping in Example 1. The draw-up speed was fixed to 7 mm/s.

First, the coating fluid for first-time dipping was coated, followed by air drying at a normal temperature for 10 to 30 minutes. Here, the coating fluid was allowed to stand also for the same time. Thereafter, the roller was reversed, and the same coating fluid as the coating fluid for first-time dipping was coated. The coating thus carried out was followed by air drying at a normal temperature for 30 minutes or more, and subsequently drying in a circulating hot air dryer at 160° C. for 1 hour. The surface layer having been dried had a layer thickness of 20 μm.

On the charging roller thus produced, the average particle diameter and content of the fine particles in the surface layer were measured in the same manner as in Example 1. The results are shown in Table 1.

The hardness of the surface layer was measured in the same manner as in Example 1. The hardness of the sheet sample prepared using the coating fluid for dipping was 89°, which was higher than the hardness 50° of the elastic layer. Thus, the hardness of the whole surface layer can be deemed to be higher than the hardness of the elastic layer.

On the charging roller of this Example, the same evaluation as that in Example 1 was also made. The results are shown in Tables 1 and 2.

EXAMPLE 4

As to the charging roller in this Example, the elastic layer was formed in the same manner as in Example 1.

The surface layer 2_d_ was formed on the elastic layer by carrying out dipping once. The surface layer 2_d_ was formed using the same one as the coating fluid for first-time dipping in Example 1. The draw-up speed was the same as that in Example 1, except that the initial-stage speed was set at 25 mm/s.

The coating thus carried out was followed by air drying at a normal temperature for 30 minutes or more, and subsequently drying in a circulating hot air dryer at 160° C. for 1 hour. The surface layer having been dried had a layer thickness of 18 μm.

On the charging roller thus produced, the average particle diameter and content of the fine particles in the surface layer were measured in the same manner as in Example 1. The results are shown in Table 1.

The hardness of the sheet sample prepared using the coating fluid for dipping (equal to the hardness of the surface layer) was 88°.

On the charging roller of this Example, the same evaluation as that in Example 1 was also made. The results are shown in Tables 1 and 2.

EXAMPLE 5

As to the charging roller in this Example, the charging roller was produced in the same manner as in Example 2 except that, in the coating fluid for first-time dipping and second-time dipping, the conductive fine tin oxide particles were changed for surface-untreated ones (average particle diameter: 0.10 μm; volume resistivity: 10 Ω·cm). The surface layer having been dried was in a layer thickness of 40 μm.

On the charging roller thus produced, the average particle diameter and content of the fine particles in the surface layer were measured in the same manner as in Example 1. The results are shown in Table 1.

The hardness of the sheet sample prepared using the coating fluid for first-time dipping and second-time dipping was 90° and the hardness of the sheet sample prepared using the coating fluid for third-time dipping was 86°; both being higher than the hardness 50° of the elastic layer. Thus, the hardness of the whole surface layer can be deemed to be higher than the hardness of the elastic layer.

On the charging roller of this Example, the same evaluation as that in Example 1 was also made. The results are shown in Tables 1 and 2.

EXAMPLE 6

A charging roller was produced in the following way.

| | (by weight) |
|---|---|
| NBR | 100 parts |
| Quaternary ammonium salt (the same one as that in Example 1) | 4 parts. |
| Calcium carbonate | 30 parts |
| Zinc oxide | 5 parts |
| Aliphatic acid | 2 parts |

The above materials were kneaded for 10 minutes by means of an enclosed mixer adjusted to 50° C., and then further kneaded for 20 minutes by means of an enclosed mixer kept cooled to 20° C. to prepare a raw-material compound. To this compound, based on 100 parts by weight of the raw-material NBR, 1 part by weight of sulfur as a vulcanizing agent and 3 parts by weight of NOCCELER TS (as a vulcanization accelerator were added, and these were kneaded for 10 minutes by means of a twin-roll mill kept cooled to 20° C. The compound thus obtained was extruded by means of an extruder around the periphery of a stainless-steel mandrel of 6 mm in diameter so as to be made into a roller, which was then vulcanized by heating and shaped by forming, followed by sanding so as to come to 12 mm in outer diameter to form the elastic layer 2_b_. The roller had a length of 232 mm.

The surface layer 2_d_ was formed on the elastic layer to cover it. The surface layer 2_d_ was formed by coating the following surface layer coating fluids by dipping. The dipping was carried out twice.

First, as a coating fluid for first-time dipping, a liquid mixture was prepared by mixing the following materials.

| | (by weight) |
|---|---|
| Caprolactone-modified acryl-polyol solution | 100 parts |
| Methyl ethyl ketone | 200 parts |
| Carbon black (product treated with hexyltrimethoxysilane; average particle diameter: 0.2 μm; volume resistivity: 0.1 Ω · cm) | 25 parts |

Using glass beads (average particle diameter: 0.8 mm) as dispersion media and using a bead-mill dispersion machine packed with this dispersion media in a packing of 80% , the above liquid mixture was circulated five times in this dispersion machine to effect dispersion. To the resulting liquid dispersion, a hexamethylene diisocyanate butanone oxime block product was so added as to be NCO/OH=1.0 to prepare a surface layer coating fluid. Thus, the coating fluid for first-time dipping was prepared.

Subsequently, as a coating fluid for second-time dipping, a coating fluid was prepared in the same manner as the coating fluid for first-time dipping, but changing the carbon black for the following one and changing the bead mill dispersion for that of 100-time circulation.

| | (by weight) |
|---|---|
| Carbon black (product treated with hexyltirmethoxysilane; average particle diameter: 0.06 μm; volume resistivity: 10 Ω · cm) | 5 parts |

Subsequently, the surface layer was formed by coating in the same manner as in Example 1. The surface layer had a layer thickness of 21 μm.

On the charging roller thus produced, the average particle diameter and content of the fine particles in the surface layer were measured in the same manner as in Example 1. The results are shown in Table 1.

The hardness of the elastic layer and surface layer was measured in the same manner as in Example 1.

The elastic layer was found to have a hardness of 45°. With regard to the surface layer, the hardness of the sheet sample prepared using the coating fluid for first-time dipping was 80° and the hardness of the sheet sample prepared using the coating fluid for second-time dipping was 76°; both being higher than the hardness 45° of the elastic layer. Thus, the hardness of the whole surface layer can be deemed to be higher than the hardness of the elastic layer.

On the charging roller of this Example, the same evaluation as that in Example 1 was also made. The results are shown in Tables 1 and 2.

EXAMPLE 7

As to the charging roller in this Example, the elastic layer was formed in the same manner as in Example 4.

The surface layer 2*d* was formed on the elastic layer to cover it. The surface layer 2*d* was formed by coating the following surface-layer coating fluids by dipping. The dipping was carried out twice.

First, as a coating fluid for first-time dipping, a liquid mixture was prepared by mixing the following materials.

| | (by weight) |
|---|---|
| Polyurethane resin | 100 parts |
| Methyl ethyl ketone | 200 parts |
| Carbon black (product treated with isopropyltriisostearoyl titanate; average particle diameter: 0.1 μm; volume resistivity: 1 Ω · cm) | 30 parts |

Using glass beads (average particle diameter: 0.8 mm) as dispersion media and using a bead-mill dispersion machine packed with this dispersion media in a packing of 80% , the above liquid mixture was circulated ten times in this dispersion machine to effect dispersion. Thus, the surface layer coating fluid for first-time dipping was prepared.

Subsequently, as a coating fluid for second-time dipping, a liquid mixture was prepared in a container glass bottle, using the following materials.

| | (by weight) |
|---|---|
| Polyurethane resin | 100 parts |
| Methyl ethyl ketone | 200 parts |
| Conductive fine tin oxide particles (product treated with hexyltrimethoxysilane; average particle diameter: 0.02 μm; volume resistivity: 20 Ω · cm) | 50 parts |

Into this container, as dispersion media, glass beads (average particle diameter: 0.8 mm) were so packed as to be in a packing of 80% , followed by dispersion for 6 hours using a paint-shaker dispersion machine.

Subsequently, the surface layer was formed by coating in the same manner as in Example 1. The surface layer had a layer thickness of 25 μm.

On the charging roller thus produced, the average particle diameter and content of the fine particles in the surface layer were measured in the same manner as in Example 1. The results are shown in Table 1.

The hardness of the elastic layer and surface layer was measured in the same manner as in Example 1.

The hardness of the sheet sample prepared using the coating fluid for first-time dipping was 58° and the hardness of the sheet sample prepared using the coating fluid for second-time dipping was 65°0; both being higher than the hardness 50° of the elastic layer. Thus, the hardness of the whole surface layer can be deemed to be higher than the hardness of the elastic layer.

On the charging roller of this Example, the same evaluation as that in Example 1 was also made. The results are shown in Tables 1 and 2.

EXAMPLE 8

As to the charging roller in this Example, the elastic layer was formed in the same manner as in Example 4.

The surface layer 2*d* was formed on the elastic layer to cover it. The surface layer 2*d* was formed by coating the following surface layer coating fluids by dipping. The dipping was carried out twice.

First, as a coating fluid for first-time dipping, a liquid mixture was prepared in a container glass bottle, using the following materials.

| | (by weight) |
|---|---|
| Polyvinyl butyral resin | 100 parts |
| Ethanol | 200 parts |
| Carbon black (product treated with isopropyltriisostearoyl titanate; average particle diameter: 0.1 μm; volume resistivity: 2 Ω · cm) | 50 parts |

Into this container, as dispersion media, glass beads (average particle diameter: 0.8 mm) were so packed as to be in a packing of 50% , followed by dispersion for 0.5 hour using a paint-shaker dispersion machine to prepare the coating fluid for first-time dipping.

Subsequently, as a coating fluid for second-time dipping, a liquid mixture was prepared in a container glass bottle, using the following materials.

| | (by weight) |
|---|---|
| Polyvinyl butyral resin | 100 parts |
| Ethanol | 200 parts |
| Carbon black (product treated with hexyltrimethoxysilane; average particle diameter: 0.1 μm; volume resistivity: 10 Ω · cm) | 50 parts |

Into this container, as dispersion media, glass beads (average particle diameter: 0.8 mm) were so packed as to be in a packing of 70% , followed by dispersion for 3 hours using a paint-shaker dispersion machine.

Subsequently, the surface layer was formed by coating in the same manner as in Example 1. The surface layer had a layer thickness of 25 μm.

On the charging roller thus produced, the average particle diameter and content of the fine particles in the surface layer were measured in the same manner as in Example 1. The results are shown in Table 1.

The hardness of the surface layer was measured in the same manner as in Example 1.

The hardness of the sheet sample prepared using the coating fluid for first-time dipping was 60° and the hardness of the sheet sample prepared using the coating fluid for second-time dipping was 61°; both being higher than the hardness 50° of the elastic layer. Thus, the hardness of the whole surface layer can be deemed to be higher than the hardness of the elastic layer.

On the charging roller of this Example, the same evaluation as that in Example 1 was also made. The results are shown in Tables 1 and 2.

EXAMPLE 9

In this Example, a charging roller was produced in the same manner as in Example 4 except that as the fine particles, the following particles were used instead in both the coating fluid for first-time dipping and the coating fluid for second-time dipping.

| | (by weight) |
|---|---|
| Fine alumina particles (surface-untreated product; average particle diameter; 0.03 μm; volume resistivity: $10^{11}$ Ω · cm) | 10 parts |

The surface layer had a layer thickness of 30 μm.

On the charging roller thus produced, the average particle diameter and the content of the fine particles in the surface layer were measured in the same manner as in Example 1. The results are shown in Table 1.

The hardness of the surface layer was measured in the same manner as in Example 1.

The hardness of the sheet sample prepared using the coating fluid for first-time dipping was 81° and the hardness of the sheet sample prepared using the coating fluid for second-time dipping was 78°; both being higher than the hardness 50° of the elastic layer. Thus, the hardness of the whole surface layer can be deemed to be higher than the hardness of the elastic layer.

On the charging roller of this Example, the same evaluation as that in Example 1 was also made. The results are shown in Tables 1 and 2.

EXAMPLE 10

In this Example, a charging roller was produced in the same manner as in Example 4 except that as the fine particles, the following particles were used instead in both the coating fluid for first-time dipping and the coating fluid for second-time dipping.

| | (by weight) |
|---|---|
| Fine titanium oxide particles (product treated with hexyltrimethoxysilane; average particle diameter: 0.03 μm; volume resistivity: 100 Ω ·0 cm) | 10 parts |

The surface layer was in a layer thickness of 35 μm.

On the charging roller thus produced, the average particle diameter and content of the fine particles in the surface layer were measured in the same manner as in Example 1. The results are shown in Table 1.

The hardness of the surface layer was measured in the same manner as in Example 1.

The hardness of the sheet sample prepared using the coating fluid for first-time dipping was 76° and the hardness of the sheet sample prepared using the coating fluid for second-time dipping was 72°; both being higher than the hardness 50° of the elastic layer. Thus, the hardness of the whole surface layer can be deemed to be higher than the hardness of the elastic layer.

On the charging roller of this Example, the same evaluation as that in Example 1 was also made. The results are shown in Tables 1 and 2.

EXAMPLE 11

In this Example, the same evaluation as that in Example 5 was made except that an electrophotographic apparatus drivable at process speeds of 94 mm/s and 47 mm/s was used instead. The results are shown in Tables 1 and 2.

EXAMPLE 12

In this Example, the same evaluation as that in Example 5 was made except that an electrophotographic apparatus drivable at process speeds of 94 mm/s and 16 mm/s was used instead. The results are shown in Tables 1 and 2.

COMPARATIVE EXAMPLE 1

In this Comparative Example 1, a charging roller was produced in the following way.

| | (by weight) |
|---|---|
| EPDM | 100 parts |
| Conductive carbon black (surface-untreated product) | 20 parts |
| Zinc oxide | 100 parts |
| Aliphatic acid | 2 parts |

The above materials were kneaded for 10 minutes by means of an enclosed mixer adjusted to 60° C. Thereafter, based on 100 parts by weight of the EPDM, 15 parts by weight of paraffin oil was added, and these were further kneaded for 20 minutes by means of an enclosed mixer kept cooled to 20° C. to prepare a raw-material compound. To this compound, based on 100 parts by weight of the raw-material EPDM, 0.5 part by weight of sulfur as a vulcanizing agent, and as vulcanization accelerators 1 part by weight of MBT (2-mercaptobenzothiazole), 1 part by weight of TMTD (tetramethylthiuram disulfide) and 1.5 parts by weight of ZnMDC (zinc dimethyldithiocarbamate) were added, and these were kneaded for 10 minutes by means of a twin-roll mill kept cooled to 20° C. The compound thus obtained was extruded by means of an extruder around the periphery of a stainless-steel mandrel of 6 mm in diameter so as to be made into a roller of 12 mm in outer diameter, which was then vulcanized by heating and shaped by forming to form an elastic layer. The roller was in a length of 232 mm.

A surface layer was formed on the elastic layer by coating the following surface layer coating fluid by dipping. The dipping was carried out once.

First, as a coating fluid for dipping, a liquid mixture was prepared in a container glass, using the following materials.

| | (by weight) |
|---|---|
| Polyvinyl butyral resin | 100 parts |
| Ethanol | 200 parts |
| Carbon black (surface-untreated product; average particle diameter: 0.1 $\mu$m; volume resistivity: 0.8 $\Omega \cdot$ cm) | 25 parts |

Into this container, as dispersion media, glass beads (average particle diameter: 0.8 mm) were so packed as to be in a packing of 80% , followed by dispersion for 24 hours using a paint-shaker dispersion machine to prepare the surface-layer coating fluid.

Using this coating fluid, the surface layer was formed by coating in the same manner as in Example 1. The surface layer had a layer thickness of 16 $\mu$m.

On the charging roller thus produced, the average particle diameter and content of the fine particles in the surface layer were measured in the same manner as in Example 1. The results are shown in Table 1.

The hardness of the elastic layer and surface layer was measured in the same manner as in Example 1.

The hardness of the elastic layer was 55°, and the hardness of the surface layer was 54°.

On the charging roller of this Comparative Example, the same evaluation as that in Example 1 was also made. The results are shown in Tables 1 and 2.

COMPARATIVE EXAMPLE 2

As to the charging roller in this Comparative Example, the elastic layer was formed in the same manner as in Comparative Example 1.

The surface layer of this Comparative Example was formed on the above elastic layer by coating the following surface layer coating fluids by dipping carried out twice.

As a coating fluid for first-time dipping, the same coating fluid for dipping as that in Comparative Example 1 was used, and was coated in the same manner as Comparative Example 1.

As a coating fluid for second-time dipping, it was prepared in the same manner as the above coating fluid for first-time dipping but using the following materials instead and changing the paint-shaker dispersion time to 6 hours.

| | (by weight) |
|---|---|
| Polyvinyl butyral resin | 100 parts |
| Ethanol | 200 parts |
| Carbon black (the same one as that in Comparative Example 1) | 50 parts |

Subsequently, the surface layer was formed by coating in the same manner as in Example 1. The surface layer had a layer thickness of 40 $\mu$m.

On the charging roller thus produced, the average particle diameter and content of the fine particles in the surface layer were measured in the same manner as in Example 1. The results are shown in Table 1.

The hardness of the surface layer was measured in the same manner as in Example 1.

The hardness of the sheet sample prepared using the coating fluid for first-time dipping was 54° and the hardness of the sheet sample prepared using the coating fluid for second-time dipping was 52°; both being lower than the hardness 55° of the elastic layer. Thus, the hardness of the whole surface layer can be deemed to be lower than the hardness of the elastic layer.

On the charging roller of this Comparative Example, the same evaluation as that in Example 1 was also made. The results are shown in Tables 1 and 2.

COMPARATIVE EXAMPLE 3

As to the charging roller in this Comparative Example, it was produced in the same manner as in Comparative Example 2 except that in the coating fluid for second-time dipping, the carbon black was in an amount of 0 part by weight.

On the charging roller thus produced, the average particle diameter and content of the fine particles in the surface layer were measured in the same manner as in Example 1. The results are shown in Table 1.

The hardness of the surface layer was measured in the same manner as in Example 1.

The hardness of the sheet sample prepared using the coating fluid for first-time dipping was 54° and the hardness of the sheet sample prepared using the coating fluid for second-time dipping was 50°; both being lower than the hardness 55° of the elastic layer. Thus, the hardness of the whole surface layer can be deemed to be lower than the hardness of the elastic layer.

On the charging roller of this Comparative Example, the same evaluation as that in Example 1 was also made. The results are shown in Tables 1 and 2.

COMPARATIVE EXAMPLE 4

As to the charging roller in this Comparative Example, the elastic layer was formed in the same manner as in Comparative Example 1.

The surface layer of this Comparative Example was formed on the above elastic layer by coating the following surface layer coating fluids by dipping carried out twice.

First, as a coating fluid for first-time dipping, a liquid mixture was prepared in a container glass bottle, using the following materials.

| | (by weight) |
|---|---|
| SEBS (styrene-ethylene/butylene-styrene) | 100 parts |
| Methanol | 100 parts |
| Toluene | 100 parts |
| Carbon black (surface-untreated product; average particle diameter: 0.2 μm; volume resistivity: 2 Ω · cm) | 50 parts |

Into this container, as dispersion media, glass beads (average particle diameter: 0.8 mm) were so packed as to be in a packing of 50% , followed by dispersion for 0.5 hour using a paint-shaker dispersion machine to prepare the coating fluid for first-time dipping.

As a coating fluid for second-time dipping, it was prepared in the same manner as the above coating fluid for first-time dipping but using the following materials instead and changing the paint-shaker dispersion time to 2 hours.

| | (by weight) |
|---|---|
| SEBS (styrene-ethylene/butylene-styrene) | 100 parts |
| Methanol | 100 parts |
| Toluene | 100 parts |
| Carbon black (surface-untreated product; average particle diameter: 0.15 μm; volume resistivity: 2 Ω · cm) | 70 parts |

Subsequently, the surface layer was formed by coating in the same manner as in Example 1. The surface layer had a layer thickness of 32 μm.

On the charging roller thus produced, the average particle diameter and content of the fine particles in the surface layer were measured in the same manner as in Example 1. The results are shown in Table 1.

The hardness of the surface layer was measured in the same manner as in Example 1.

The hardness of the sheet sample prepared using the coating fluid for first-time dipping was 53° and the hardness of the sheet sample prepared using the coating fluid for second-time dipping was 54°; both being lower than the hardness 55° of the elastic layer. Thus, the hardness of the whole surface layer can be deemed to be lower than the hardness of the elastic layer.

On the charging roller of this Comparative Example, the same evaluation as that in Example 1 was also made. The results are shown in Tables 1 and 2.

COMPARATIVE EXAMPLE 5

As to the charging roller in this Comparative Example, the elastic layer was formed in the same manner as in Comparative Example 1.

The surface layer of this Comparative Example was formed on the above elastic layer by coating the following surface layer coating fluids by dipping carried out twice.

First, as a coating fluid for first-time dipping, a liquid mixture was prepared by mixing the following materials.

| | (by weight) |
|---|---|
| SEBS (styrene-ethylene/butylene-styrene) | 100 parts |
| Methanol | 100 parts |
| Toluene | 100 parts |
| Carbon black (product treated with isopropyltriisostearoyl titanate; average particle diameter: 0.02 μm; volume resistivity: 0.8 Ω · cm) | 10 parts |

Carbon black (product treated with isopropyltriisostearoyl titanate; average particle diameter: 0.02 μm; volume resistivity: 0.8 Ω·cm) 10 parts Using glass beads (average particle diameter: 0.3 mm) as dispersion media and using a bead-mill dispersion machine packed with this dispersion media in a packing of 85% , the above liquid mixture was circulated for 72 hours in this dispersion machine to effect dispersion. Thus, the surface-layer coating fluid for first-time dipping was prepared.

As a coating fluid for second-time dipping, it was prepared in the same manner as the above coating fluid for first-time dipping but using the following materials instead and changing the dispersion time to 100 hours.

| | (by weight) |
|---|---|
| SEBS (styrene-ethylene/butylene-styrene) | 100 parts |
| Methanol | 100 parts |
| Toluene | 100 parts |
| Carbon black (surface-untreated product; average particle diameter: 0.15 μm; volume resistivity: 2 Ω · cm) | 5 parts |

Subsequently, the surface layer was formed by coating in the same manner as in Example 1. The surface layer had in a layer thickness of 26 μm.

On the charging roller thus produced, the average particle diameter and content of the fine particles in the surface layer were measured in the same manner as in Example 1. The results are shown in Table 1.

The hardness of the surface layer was measured in the same manner as in Example 1.

The hardness of the sheet sample prepared using the coating fluid for first-time dipping was 50° and the hardness of the sheet sample prepared using the coating fluid for second-time dipping was 51°; both being lower than the hardness 55° of the elastic layer. Thus, the hardness of the whole surface layer can be deemed to be lower than the hardness of the elastic layer.

On the charging roller of this Comparative Example, the same evaluation as that in Example 1 was also made. The results are shown in Tables 1 and 2.

TABLE 1

| | Fine particles | | | | | | | | | |
|---|---|---|---|---|---|---|---|---|---|---|
| | Av. particle diameter Surface layer | | Content Surface layer | | Charging uniformity image level Environment | | | Pinhole leak = proofness image level Environment | | |
| | Lower part (µm) | Upper part (µm) | Lower part (%) | Upper part (%) | 1 | 2 | 3 | 1 | 2 | 3 |
| Example: | | | | | | | | | | |
| 1 | 0.075 | 0.018 | 85 | 25 | 1 | 1 | 1 | 1 | 1 | 1 |
| 2 | 0.051 | 0.0012 | 92 | 61 | 1 | 1 | 2 | 1 | 2 | 1 |
| 3 | 0.068 | 0.045 | 90 | 65 | 1 | 1 | 1 | 1 | 1 | 1 |
| 4 | 0.072 | 0.050 | 79 | 70 | 2 | 1 | 2 | 2 | 2 | 1 |
| 5 | 0.253 | 0.046 | 90 | 85 | 2 | 1 | 2 | 2 | 2 | 1 |
| 6 | 0.365 | 0.125 | 25 | 12 | 2 | 2 | 2 | 2 | 2 | 1 |
| 7 | 0.865 | 0.521 | 89 | 75 | 3 | 2 | 3 | 2 | 3 | 2 |
| 8 | 1.921 | 0.954 | 92 | 87 | 3 | 3 | 2 | 3 | 3 | 2 |
| 9 | 1.236 | 0.758 | 78 | 62 | 3 | 2 | 3 | 2 | 2 | 2 |
| 10 | 1.512 | 0.425 | 85 | 56 | 2 | 2 | 3 | 2 | 2 | 2 |
| 11 | 0.865 | 0.521 | 89 | 75 | 2 | 2 | 3 | 2 | 2 | 2 |
| 12 | 0.865 | 0.521 | 89 | 75 | 3 | 2 | 3 | 3 | 3 | 2 |
| Comparative Example: | | | | | | | | | | |
| 1 | 0.412 | 0.412 | 87 | 87 | 4 | 3 | 4 | 4 | 4 | 3 |
| 2 | 0.412 | 0.528 | 87 | 89 | 4 | 4 | 4 | 4 | 4 | 4 |
| 3 | 0.412 | 0.000 | 87 | 0 | 3 | 3 | 4 | 4 | 4 | 4 |
| 4 | 1.950 | 1.380 | 95 | 93 | 4 | 4 | 3 | 4 | 4 | 3 |
| 5 | 0.018 | 0.005 | 63 | 46 | 4 | 4 | 4 | 3 | 3 | 2 |

TABLE 2

| | Running test image level | | | | | |
|---|---|---|---|---|---|---|
| | Environment 1 | | Environment 2 | | Environment 3 | |
| | 5,000 sheets | 10,000 sheets | 5,000 sheets | 10,000 sheets | 5,000 sheets | 10,000 sheets |
| Example: | | | | | | |
| 1 | 1 | 1 | 1 | 1 | 1 | 1 |
| 2 | 1 | 1 | 1 | 1 | 1 | 2 |
| 3 | 1 | 1 | 1 | 1 | 1 | 1 |
| 4 | 1 | 1 | 1 | 1 | 1 | 2 |
| 5 | 1 | 1 | 1 | 1 | 2 | 2 |
| 6 | 2 | 2 | 2 | 2 | 2 | 2 |
| 7 | 2 | 2 | 2 | 2 | 2 | 3 |
| 8 | 2 | 3 | 3 | 3 | 2 | 3 |
| 9 | 2 | 3 | 2 | 3 | 2 | 3 |
| 10 | 2 | 2 | 3 | 3 | 2 | 2 |
| 11 | 2 | 3 | 3 | 3 | 2 | 3 |
| 12 | 2 | 3 | 2 | 3 | 3 | 3 |
| Comparative Example: | | | | | | |
| 1 | 3 | 4 | 3 | 4 | 4 | 4 |
| 2 | 3 | 4 | 4 | 4 | 3 | 4 |
| 3 | 4 | 4 | 4 | 4 | 4 | 4 |
| 4 | 4 | 4 | 4 | 4 | 3 | 3 |
| 5 | 4 | 4 | 4 | 4 | 4 | 4 |

As described above, the present invention can provide a conductive member which can contribute to the formation of good images over a long period of time even in the electrophotographic apparatus that can set a plurality of different process speeds in one machine so as to be adaptable to various kinds of media (transfer materials), and also can be used as a charging member to which only direct-current voltage is applied. The present invention can also provide the process cartridge and the electrophotographic apparatus which have the above conductive member as a charging member.

What is claimed is:

1. A conductive member comprising:

a support; and at least one cover layer provided on said support and comprising a surface layer containing fine particles, wherein said surface layer comprises:

a surface-layer lower part extending from the lowermost plane of said surface layer to a portion of said surface layer that is within 30% of the total layer thickness of said surface layer from the lowermost plane; and a surface-layer upper part extending from the uppermost plane of said surface layer to a portion of said surface layer that is within 30% of the total layer thickness of said surface layer from the uppermost plane, wherein the average particle diameter of the fine particles present at the surface-layer lower part is larger than the average particle diameter of the fine particles present at the surface-layer upper part, wherein the fine particles present at said surface-layer lower part have an average particle diameter of from 0.02 µm to 2.0 µm and the fine particles present at said surface-layer upper part have an average particle diameter of from 0.001 µm to 1.0 µm.

2. The conductive member according to claim 1, wherein the fine particles present at said surface layer have particle diameters of from 0.001 µm to 2 µm.

3. The conductive member according to claim 1, wherein said surface layer contains at least two kinds of fine particles having different average particle diameters.

4. The conductive member according to claim 1, wherein said surface layer contains at least two kinds of fine particles; and wherein at least one kind of the fine particles comprises conductive fine particles having a volume resistivity of less than $1\times10^{10}$ Ω·cm and at least one kind of the fine particles comprises insulating fine particles having a volume resistivity of $1\times10^{10}$ Ω·cm or more.

5. The conductive member according to claim 1, wherein the number of fine particles present at said surface-layer lower part is larger than the number of fine particles in said surface-layer upper part.

6. The conductive member according to claim 1, wherein at least one kind of the fine particles present at said surface layer are surface-treated fine particles.

7. The conductive member according to claim 6, wherein said surface-treated fine particles are surface-treated particles of carbon black.

8. The conductive member according to claim 1, wherein said surface layer comprises a binder material containing a nitrogen atom or an oxygen atom.

9. The conductive member according to claim 1, wherein said surface layer contains a releasing material.

10. The conductive member according to claim 1, wherein said cover layer comprises an elastic layer provided between said support and said surface layer and having conductivity and elasticity, and wherein said elastic layer has a hardness which is lower than the hardness of said surface layer.

11. The conductive member according to claim 1, wherein said conductive member is a charging roller configured to charge an electrophotographic photosensitive member electrostatically.

12. A process cartridge comprising:

an electrophotographic photosensitive member; and charging means, wherein said charging means and said electrophotographic photosensitive member are integrally supported, and detachably mountable to a main body of an electrophotographic apparatus, wherein said charging means comprises a conductive member comprising:

a support; and at least one cover layer provided on said support and comprising a surface layer containing fine particles, wherein said surface layer comprises:

a surface-layer lower part extending from the lowermost plane of said surface layer to a portion of said surface layer that is within 30% of the total layer thickness of said surface layer from the lowermost plane; and a surface-layer upper part extending from the uppermost plane of said surface layer to a portion of said surface layer that is within 30% of the total layer thickness of said surface layer from the uppermost plane, wherein the average particle diameter of the fine particles present at the surface-layer lower part is larger than the average particle diameter of the fine particles present at the surface-layer upper part, wherein said conductive member comprises a charging member configured to charge said electrophotographic photosensitive member electrostatically, and wherein the fine particles present at said surface-layer lower part have an average particle diameter of from 0.02 μm to 2.0 μm and the fine particles present at said surface-layer upper part have an average particle diameter of from 0.001 μm to 1.0 μm.

13. The process cartridge according to claim 12, wherein said conductive member is a member disposed in contact with, or adjacent to, said electrophotographic photosensitive member.

14. An electrophotographic apparatus comprising:

an electrophotographic photosensitive member;

charging means for charging said electrophotographic photosensitive member;

exposure means for exposing said electrophotographic photosensitive member to image light to form a latent image on said electrophotographic photosensitive member;

developing means for developing said latent image; and transfer means for transferring the developed image to a transfer material, wherein said charging means comprises a conductive member comprising:

a support; and at least one cover layer provided on said support and comprising a surface layer containing fine particles, wherein said surface layer comprises:

a surface-layer lower part extending from the lowermost plane of said surface layer to a portion of said surface layer that is within 30% of the total layer thickness of said surface layer from the lowermost plane; and a surface-layer upper part extending from the uppermost plane of said surface layer to a portion of said surface layer that is within 30% of the total layer thickness of said surface layer from the uppermost plane, wherein the average particle diameter of the fine particles present at the surface-layer lower part is larger than the average particle diameter of the fine particles present at the surface-layer upper part, wherein said conductive member comprises a charging member configured to charge said electrophotographic photosensitive member electrostatically, and wherein the fine particles present at said surface-layer lower part have an average particle diameter of from 0.02 μm to 2.0 μm and the fine particles present at said surface-layer upper part have an average particle diameter of from 0.001 μm to 1.0 μm.

15. The electrophotographic apparatus according to claim 14, wherein said conductive member is a member disposed in contact with, or adjacent to, said electrophotographic photosensitive member.

16. The electrophotographic apparatus according to claim 15, wherein said conductive member is a member receiving a voltage which is only a direct-current voltage.

17. The electrophotographic apparatus according to claim 15, wherein said apparatus is settable at two or more different process speeds, and wherein at least one process speed is 50 mm/s or less, and at least one process speed is 60 mm/s or more.

* * * * *

UNITED STATES PATENT AND TRADEMARK OFFICE

CERTIFICATE OF CORRECTION

PATENT NO. : 6,962,746 B2
APPLICATION NO. : 10/410299
DATED : November 8, 2005
INVENTOR(S) : Taniguchi et al.

It is certified that error appears in the above-identified patent and that said Letters Patent is hereby corrected as shown below:

COLUMN 6
Line 26, “can not” should read --cannot--.

COLUMN 10
Line 57, “layer the” should read --the layer--.

COLUMN 13
Line 63, “can not” should read --cannot--.

COLUMN 18
Line 20, “80% ,” should read --80%,--.

COLUMN 20
Line 31, “70% ,” should read --70%,--.
Line 60, “air dryed” should read --air-dried--.

COLUMN 23
Line 12, “80% ,” should read --80%,--.

COLUMN 24
Line 12, “80% ,” should read --80%,--.
Line 32, “80% ,” should read --80%,--.

COLUMN 25
Line 12, “50% ,” should read --50%,--.
Line 29, “70% ,” should read --70%,--.

COLUMN 27
Line 45, “80% ,” should read --80%,--.

COLUMN 29
Line 19, “50% ,” should read --50%--.

UNITED STATES PATENT AND TRADEMARK OFFICE

CERTIFICATE OF CORRECTION

PATENT NO. : 6,962,746 B2
APPLICATION NO. : 10/410299
DATED : November 8, 2005
INVENTOR(S) : Taniguchi et al.

It is certified that error appears in the above-identified patent and that said Letters Patent is hereby corrected as shown below:

<u>COLUMN 30</u>
Line 20, "80% ," should read --80%,--.

Signed and Sealed this

Twenty-second Day of August, 2006

JON W. DUDAS
*Director of the United States Patent and Trademark Office*